US011017209B2

(12) United States Patent
Sehgal et al.

(10) Patent No.: US 11,017,209 B2
(45) Date of Patent: May 25, 2021

(54) MILLIMETER WAVE RADAR AND CAMERA FUSION BASED FACE AUTHENTICATION SYSTEM

(71) Applicant: Samsung Electronics Co., Ltd., Suwon-si (KR)

(72) Inventors: Abhishek Sehgal, Richardson, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/586,441

(22) Filed: Sep. 27, 2019

(65) Prior Publication Data

US 2020/0293753 A1    Sep. 17, 2020

Related U.S. Application Data

(60) Provisional application No. 62/818,980, filed on Mar. 15, 2019.

(51) Int. Cl.
*G06K 9/00* (2006.01)
*G06F 21/32* (2013.01)
(Continued)

(52) U.S. Cl.
CPC ............ *G06K 9/00255* (2013.01); *G01J 3/36* (2013.01); *G06F 21/32* (2013.01); *G06K 9/2027* (2013.01); *H04W 12/06* (2013.01)

(58) Field of Classification Search
CPC ............ G06K 9/00255; G06K 9/2027; G06K 9/00288; G06F 21/32; H04W 12/06;
(Continued)

(56) References Cited

U.S. PATENT DOCUMENTS 7,602,942 B2    10/2009 Bazakos et al.
10,102,419 B2 *   10/2018 Allyn .................... G01S 13/867
(Continued)

FOREIGN PATENT DOCUMENTS

WO    2014043620 A1    3/2014

OTHER PUBLICATIONS

Ross et al., "Feature level fusion in biometric systems", Proceedings of Biometric Consortium Conference (BCC), Sep. 2004, 2 pages.
(Continued)

*Primary Examiner* — Brian E Miller

(57) ABSTRACT

An electronic device, a method and computer readable medium for multimodal authentication are disclosed. The method includes receiving a request for authentication, facial signature data generated based on an input from a radar source of the electronic device, and facial image data generated based on an input from a camera of the electronic device. The method also includes identifying an illumination condition and a sensor condition associated with the electronic device. The method additionally includes assigning a weight associated with the camera and the radar source based on the illumination condition and the sensor condition. The method further includes granting the request when at least one of the facial signature data and the facial image data are within a threshold of similarity with a preregistered facial data associated with the weight.

20 Claims, 8 Drawing Sheets

(51) Int. Cl.
    *H04W 12/06*     (2021.01)
    *G01J 3/36*     (2006.01)
    *G06K 9/20*     (2006.01)

(58) Field of Classification Search
    CPC .......... G01J 3/36; G01S 13/867; G01S 7/412; G01S 13/88; G01S 7/417; G01S 13/522
    See application file for complete search history.

(56) References Cited

U.S. PATENT DOCUMENTS

| | | | |
|---|---|---|---|
| 10,222,469 B1 * | 3/2019 | Gillian | G01S 7/412 |
| 10,469,830 B2 | 11/2019 | Chan et al. | |
| 2009/0002220 A1 * | 1/2009 | Lovberg | G01S 13/913 342/33 |
| 2009/0060293 A1 * | 3/2009 | Nagao | G06K 9/00221 382/118 |
| 2013/0121584 A1 * | 5/2013 | Bourdev | G06K 9/00281 382/190 |
| 2013/0251214 A1 * | 9/2013 | Chung | G06K 9/00161 382/116 |
| 2014/0119618 A1 * | 5/2014 | Kim | G06K 9/00275 382/118 |
| 2015/0161434 A1 | 6/2015 | Ross et al. | |
| 2016/0071111 A1 | 3/2016 | Wang et al. | |
| 2017/0124384 A1 * | 5/2017 | Allyn | G06K 9/2018 |
| 2019/0011534 A1 * | 1/2019 | Trotta | G06F 21/32 |
| 2019/0050692 A1 * | 2/2019 | Sharma | G06K 9/6292 |
| 2019/0187265 A1 | 6/2019 | Barbello et al. | |
| 2020/0019686 A1 | 1/2020 | Min et al. | |
| 2020/0184055 A1 * | 6/2020 | Storm | H04L 63/00 |
| 2020/0293753 A1 * | 9/2020 | Sehgal | G06K 9/00255 |

OTHER PUBLICATIONS

Turk et al., "Face Recognition Using Eigenfaces", Proceedings, 1991 IEEE Computer Society Conference on Computer Vision and Pattern Recognition, Jun. 1991, pp. 586-591.

International Search Report and Written Opinion of the International Searching Authority in connection with International Application No. PCT/KR2020/003405 dated Jun. 18, 2020, 8 pages.

* cited by examiner

MILLIMETER WAVE RADAR AND CAMERA FUSION BASED FACE AUTHENTICATION SYSTEM

CROSS-REFERENCE TO RELATED APPLICATION AND CLAIM OF PRIORITY

This application claims priority under 35 U.S.C. § 119(e) to U.S. Provisional Patent Application No. 62/818,980 filed on Mar. 15, 2019. The above-identified provisional patent application is hereby incorporated by reference in its entirety.

TECHNICAL FIELD

This disclosure relates generally to biometric authentication. More specifically, this disclosure relates to radar and camera based biometric authentication on electronic devices.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services using a mobile communication network, but can also offer video call services, messaging services, data transmission service, multimedia services, as well as provide content to a user. Some of the functions and features that an electronic device can perform, such as documents, files, programs, systems, and information, can include confidential and sensitive information that require the electronic device to verify the user prior to providing access.

An electronic device can verify a user prior to allowing a user access to certain functions and features by authenticating the user. A user can input credentials such as a user identification (ID) and a password, which are specific to the content the user desires to access, for authentication purposes. After inputting the credentials, the electronic device determines on whether the inputted credentials match a preregistered set of credentials. When the inputted credentials match a preregistered set of credentials, the user is authenticated and providing the requested content. Since a user ID and password are intangible, the electronic device is unable to determine, based on the user ID and the password alone, whether the password was used by a third party who would otherwise not have access to the requested content. Anyone who acquires the credentials of a user can then illicitly gain access to the content by masquerading as the authorized user.

SUMMARY

This disclosure provides millimeter wave radar and camera fusion based face authentication system.

In one embodiment, electronic device for multimodal authentication is provided. The electronic device includes a radar source, a camera, and a processor. The radar source is configured to generate a first input. The camera is configured to generate a second input. The processor is configured to generate facial signature data from the first input and facial image data from the second input. The processor is also configured to receive a request for authentication. The processor is additionally configured to identify an illumination condition and a sensor condition associated with the electronic device. The processor is further configured to assign a weight associated with the camera and the radar source based on the illumination condition and the sensor condition. The processor is also configured to grant the request when at least one of the facial signature data and the facial image data are within a threshold of similarity with a preregistered facial data associated with the weight.

In another embodiment, a method for multimodal authentication on an electronic device is provided. The method includes receiving a request for authentication, facial signature data generated based on an input from a radar source of the electronic device, and facial image data generated based on an input from a camera of the electronic device. The method also includes identifying an illumination condition and a sensor condition associated with the electronic device. The method additionally includes assigning a weight associated with the camera and the radar source based on the illumination condition and the sensor condition. The method further includes granting the request when at least one of the facial signature data and the facial image data are within a threshold of similarity with a preregistered facial data associated with the weight.

In yet another embodiment a non-transitory computer readable medium embodying a computer program is provided. The computer program comprising computer readable program code that, when executed by a processor of an electronic device, causes the processor to: receive a request for authentication, facial signature data generated based on input from a radar source of the electronic device, and facial image data generated based on input from a camera of the electronic device; identify an illumination condition and a sensor condition associated with the electronic device; assign a weight associated with the camera and the radar source based on the illumination condition and the sensor condition; and grant the request when at least one of the facial signature data and the facial image data are within a threshold of similarity with a preregistered facial data associated with the weight.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
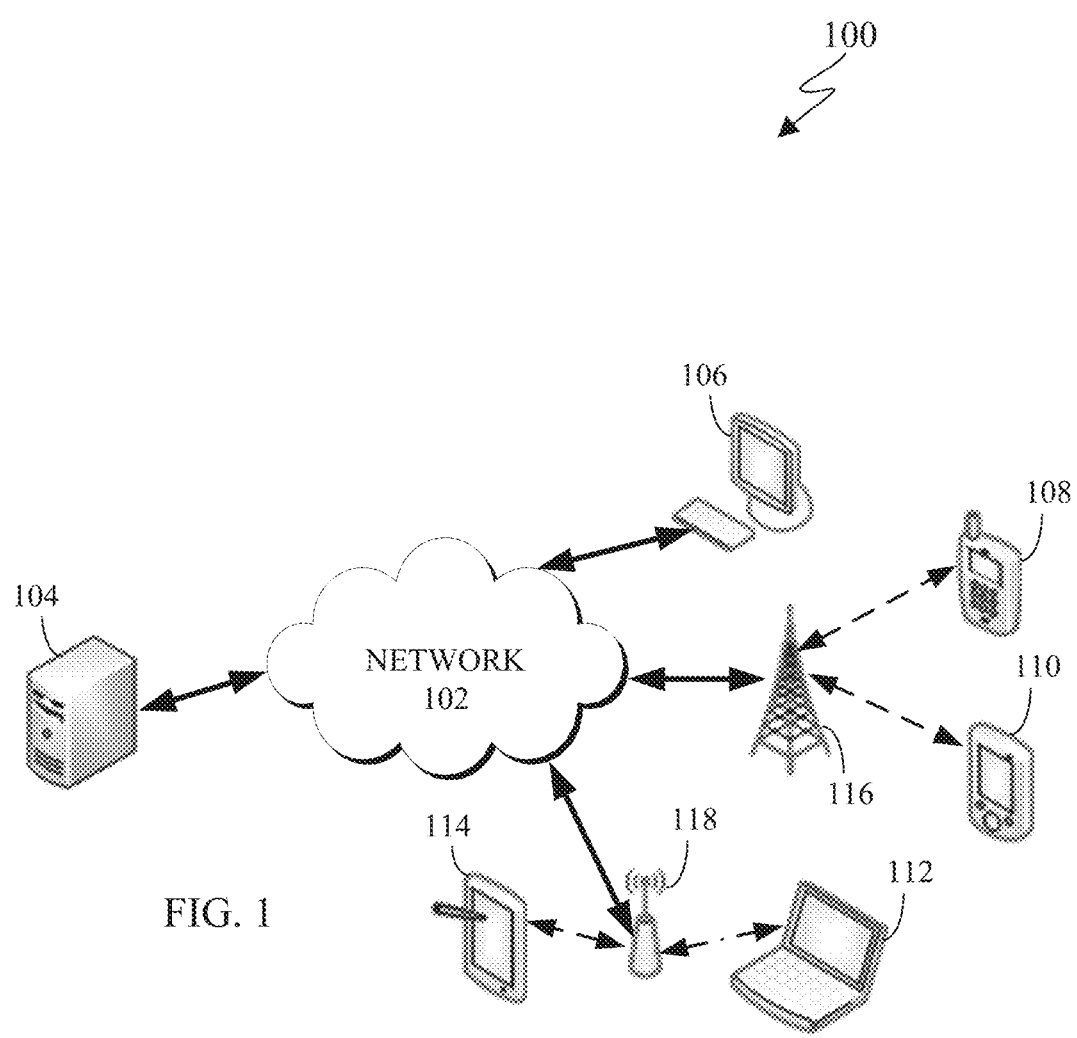
FIG. 1 illustrates an example communication system according to embodiments of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include personal computers (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), portable multimedia players (PMPs), MP3 players, mobile medical devices, virtual reality headsets, portable game consoles, cameras, and wearable devices, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices, and can include new electronic devices depending on the development of technology. It is noted that as used herein, the term "user" may denote a human or another device (such as an artificial intelligent electronic device) using the electronic device.

Certain electronic devices include a graphical user interface (GUI) such as a display that allows a user to view information displayed on the display in order to interact with the electronic device. Electronic devices can also include a user input device, such as keyboard, a mouse, a touchpad, a camera, among others. The various types of input devices allow a user to interact with the electronic device. Various electronic devices can also include a combination of a user input device and a GUI, such as a touch screen. Touch screens allow a user to interact with the electronic device via touching the display screen itself. Content that is displayed on the GUI can include confidential or sensitive information, which require the electronic device to authenticate the user prior providing the information to the user.

An electronic device can employ one or more authentication mechanisms to authorize a user to access content on an electronic device as well as access to physical and digital resources such as buildings, rooms, computing devices, and digital content, and the like. The electronic device itself can require a form of authentication that verifies the user is an approved user of the electronic device, prior to granting access to the electronic device. Similarly, an electronic device can employ one or more authentication mechanisms that provide a user with access to content that is located remotely from the electronic device. For example, a remote server can require the electronic device to verify the identity of the user prior to granting access to the content of the remote server, in order to prevent unauthorized access to confidential or personal information.

Authentication mechanisms can include passwords, gestures, and biometrics. Biometric authentication can include personal identifiers of a user such as a fingerprint of the user, a face of the user, an iris of the user, a retina of the user, and the like. Biometric authentication is a security process that relies on the unique physical characteristics and/or biological characteristics of an individual to verify and authenticate the user. User biometric data is difficult to forge as it is unique to each individual person. Facial recognition uses a camera to capture the face of the user or the eye of the user.

Biometric authentication systems compare captured biometric data to preregistered biometric data of the user. For example, an image capturing device, such as a camera, can acquire an image of particular biometric characteristic of the user, such as the face of the user, the fingerprint of the user, or the like. It is noted that an object or other body parts of the user can be used for authentication purposes. The captured image of the particular biometric characteristic represents a unique signature, such as a secret password, that when matched with preregistered data, allows access to the electronic device, or content while preventing access to unauthorized persons. The electronic device determines whether to authenticate the user and provide access to the requested content based on whether the captured image of particular biometric characteristic matches a preregistered biometric characteristic. If both the captured biometric data and the preregistered biometric data are within a threshold of similarity, the user is authenticated, and provided access to the requested content. Poor lighting conditions can detrimentally affect the captured image for biometric authentication, such that an authorized user is mistakenly denied access due to the poor quality of the captured image.

Embodiments of the present disclosure recognize and take into consideration that, vision based biometric authentication systems can capture a poor sample for authentication purposes based on external constraints. For example, biometric authentication can fail to capture an image of a user of a quality necessary for authentication purposes when ambient lighting poor.

Embodiments of the present disclosure include systems and methods for using both radar and a camera for biometric authentication. For example, embodiments of the present disclosure provide a user authentication mechanism that creates a unique biometric signature by combining both a radar signature from a radar transceiver and an image from a camera. In certain embodiments, the radar is used to extract reflection signatures from the users face, or another object, and leverage that capability to create an authentication parameter. A camera associated with or located on the electronic device is used to identify the user based on a captured image. As described herein the radar signature data and the image data represent the face of the user of the electronic device, however it should be noted, that radar signature data and the image data is not limited to only the face of the user.

In certain embodiments, the systems and methods for using both radar and camera based authentication can indicate using only image data captured by the camera, using only the radar signature data provided by the radar transceiver, or using a combination of both the image data and the radar signature data, based on illumination and sensor conditions. For example, an electronic device can capture both an image of the user via a camera and a radar transceiver representing the user. The electronic device can determine the confidence or reliability levels of the camera and the radar transceiver based on various illumination conditions. Based on the confidence level, the electronic device assigns a weight to the camera source and the radar source when determining whether to authenticate the user. The weight indicates the confidence level associated with each of the image data and the radar signature data. For example, if the confidence level of the camera is low, such as when the lighting is poor, the weight assigned to the camera is lower than the weight assigned to the radar data. Similarly, during poor lighting the weight assigned to the radar data is larger than the weight assigned to the image data. Alternatively, when the confidence level of the radar is low, such as when an antenna is blocked or being used for another purpose, the weight assigned to the image from the camera is larger than the weight assigned to the radar signature. Similarly, when the antenna is blocked or being used for another purpose, the weight assigned to the radar data can be smaller than the weight assigned to the image data.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from images or radar signatures for authentication purposes. In certain embodiments, a neural network is included within any of the client devices 106-114. When a neural network is included in a client device, the client device can user the neural network to extract features from images or radar signatures for authentication purposes, without having to transmit content over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals for biometric authentication via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s).

In certain embodiments, any of the client devices 106-114 transmit information securely and efficiently to another device, such as, for example, the server 104. Also, any of the client devices 106-114 can trigger the information transmission between itself and server 104. Any of the client devices 106-114 can function as a radar emitter and collector for biometric authentication purposes. For example, any of the client devices 106-114 can collect and compare biometric data of the user to preregistered biometric data to authenticate the user. After the user is authenticated, the client devices 106-114 can provide access to the user of the requested content, such as information that is locally stored on a respective client device, stored on another client device, or stored on the server 104.

For instance, if the mobile device 108 authenticates the user, the mobile device 108 can grant the user access to the secured content or request the content from another device, such as another client device or the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
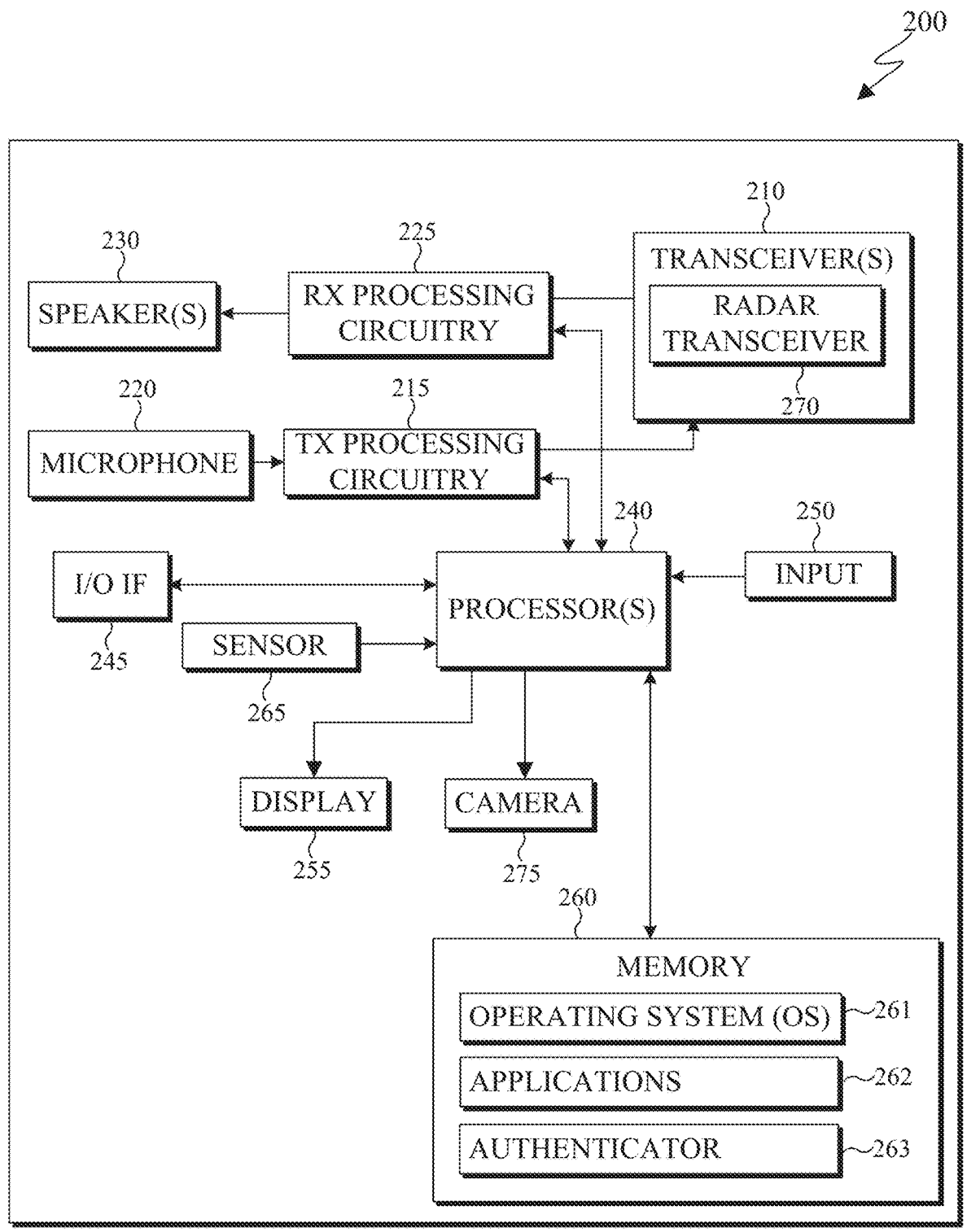
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WI-FI transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, a sensor 265, and a camera 275. The memory 260 includes an operating system (OS) 261, one or more applications 262, and an authenticator 263.

The transceiver(s) 210 can include an antenna array including numerous antennas. The transceiver(s) 210 transmit and receive a signal or power to or from the electronic device 200. The transceiver(s) 210 receives an incoming signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to an signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include an authentication program 263 as well as a program or file that requires authentication prior to accessing.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, the camera 275, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc. The memory 260 also can include sensitive and confidential information, which require user authentication via the authenticator 263 prior to accessing. For example, the authenticator 263 verifies the identity of the user. It is noted that the authenticator 263 can be one of the applications 262.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 includes is a radar transceiver 270 configured to transmit and receive signals for detection and ranging purposes. For example, the radar transceiver 270 may be any type of transceiver including, but not limited to a WiFi transceiver, for example, an 802.11ay transceiver. The radar transceiver 270 includes an antenna array. The radar transceiver 270 can transmit signals at a frequency less than or equal to 100 GHz. For example, the radar transceiver 270 can transmit signals at frequencies including, but not limited to, 6-8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 100.

In certain embodiments, the radar transceiver 270 can include a transmitter and a receiver. The transmitter can transmit millimeter wave (mmWave) signals. The receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the objection by mapping the various distances.

The electronic device 200 can include one or more cameras 275. The camera 275 can represent any number of devices that can capture or generate an image. For example, the camera 275 captures a color image such as RGB or a black and white image. The camera 275 can capture a still image or video. The camera 275 can capture an image of a body part of the user, such as the users face. In certain embodiments, the camera 275 can capture an image of an object. The camera 275 can capture an image that of a quality that can be used for authentication purposes. For example, the camera 275 can provide a captured image to the authenticator 263 which determines whether to authenticate the user.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3A:
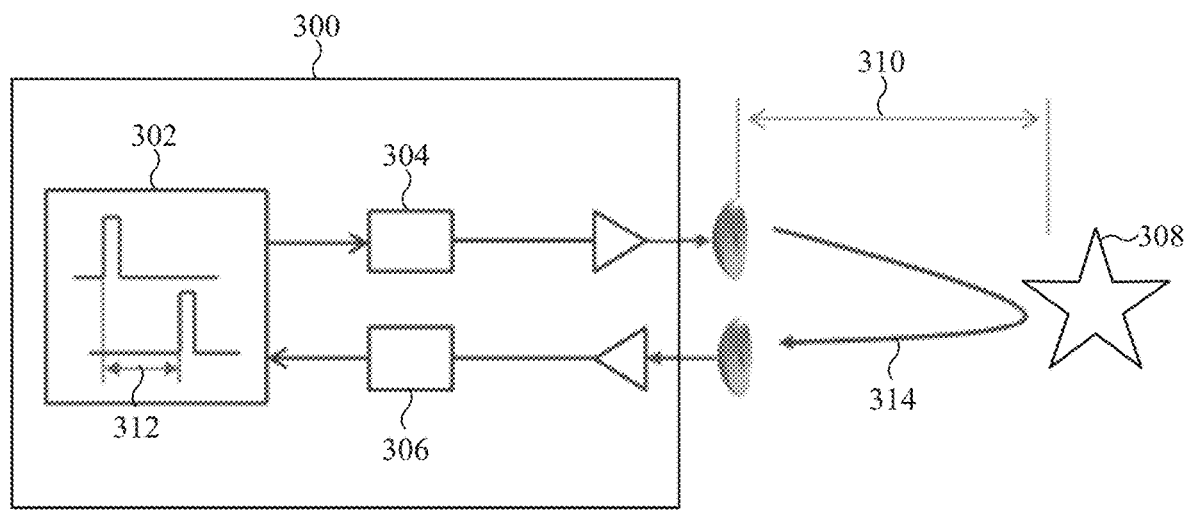
FIG. 3A illustrates an example architecture of a monostatic radar according to embodiments of this disclosure.
Figure 3B:
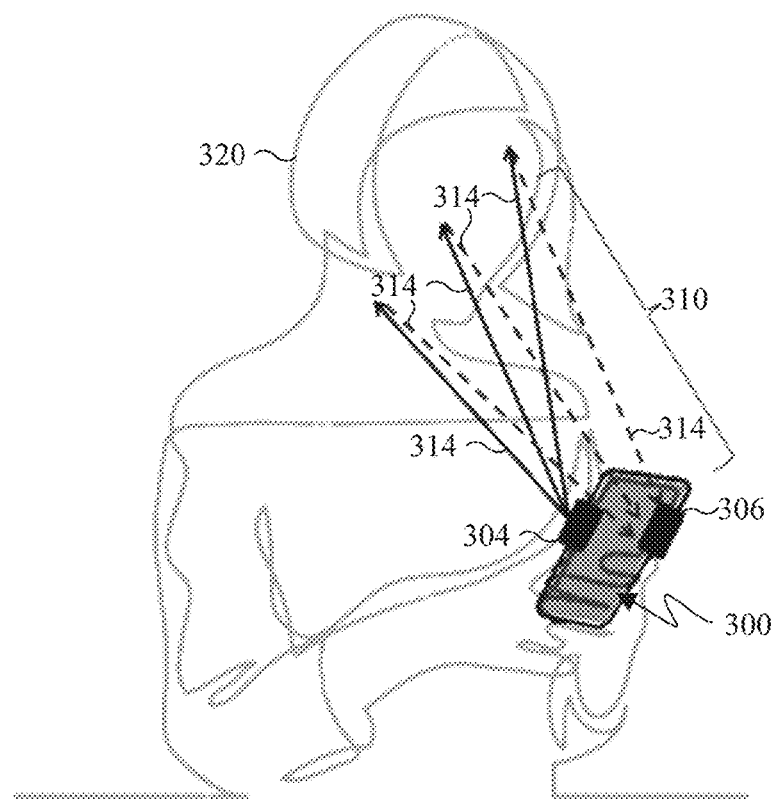
FIG. 3B illustrates an example electronic device performing radar based authentication.

FIG. 3A illustrates an example architecture of a monostatic radar in accordance with an embodiment of this disclosure. FIG. 3B illustrates an example of a radar based authentication of a user in accordance with an embodiment of this disclosure. The embodiments of FIGS. 3A and 3B are for illustration only. Other embodiments can be used without departing from the scope of the present disclosure.

FIGS. 3A and 3B illustrate an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 transmits a signal 314 to the target object 308. A target object 308 is located a distance 310 from the electronic device 300. In certain embodiments, the target object 308 of FIG. 3A is the user 320 of FIG. 3B when the electronic device 300 is performing biometric authentication. For example, the transmitter 304 transmits a signal 314. The signal 314 is reflected off of the target object 308 and received by the receiver 306. The signal 314 of FIG. 3B represents a transmitted signal when it is a solid line is a reflected signal when it is a dashed line.

The processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after is reflected or bounced off of the target object 308. Based on the time difference 312, the processor 302 derives the distance 310 between the electronic device 300, and the target object 308. When multiple signals, such as the signal 314 are transmitted and received, a mapping of the target object 308 can be derived by the processor 312. The mapping indicates a surface of the target object 308.

Monostatic radar is characterized for its delayed echo as the transmitter 304 of the radar signal and the receiver 306 of the radar signal essentially at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference A pulse radar is generated as a realization of a desired radar waveform, modulated onto a radio carrier frequency, and transmitted through a power amplifier and antenna, such as a parabolic antenna. In certain embodiments, the antenna is omnidirectional. In other embodiments, the antenna is focused into a particular direction. When the target object 308 is within the field of view of the transmitted signal and within a distance 310 from the radar location, then the target object 308 will be illuminated by RF power density (W/m$^2$), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \quad \text{Equation (1)}$$

Referring to Equation (1), $P_T$ is the transmit power (W). $G_T$ describes the transmit antenna gain (dBi) and $A_T$ is an effective aperture area (m$^2$). $\lambda$ corresponds to the wavelength of the radar signal RF carrier signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{ref1} = p_t A_t G_t \sim p_t A_t r_t \frac{A_t}{\lambda^2/4\pi} = p_t RSC \quad \text{Equation (2)}$$

In Equation (2), $P_{ref1}$ describes the effective isotropic target-reflected power (W). The term, $A_t$ described the effective target area normal to the radar direction (m$^2$). The term $r_t$ describes the reflectivity of the material and shape, which can range from [0, . . . , 1]. The term $g_t$ describes the corresponding aperture gain (dBi). RSC is the radar cross section (m$^2$) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m$^2$). In certain embodiments, $A_R$ is the same as $A_t$.

$$P_R = \frac{P_{ref1}}{4\pi R^2} A_R = P_T \cdot RSC \frac{A_T A_R}{4\pi \lambda^2 R^4} \quad \text{Equation (3)}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constraint multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad \text{Equation (4)}$$

When the radar signal is a short pulse of duration or width, $T_p$, the delay or time difference 312 between the transmission and reception of the corresponding echo is described in Equation (5). $\tau$ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_p$ exhibits a power spectral density as described in Equation (7) and includes a first null at its bandwidth as shown in Equation (8). The range resolution of a radar signal fundamental connected with the bandwidth of the radar waveform is expressed in Equation (9).

$$\tau = 2R/c \quad \text{Equation (5)}$$

$$\Delta R = c\Delta\tau/2 = cT_p/2 \quad \text{Equation (6)}$$

$$P(f) \sim (\sin(\pi f T_p)/(\pi f T_p))^2 \quad \text{Equation (7)}$$

$$B = 1/T_p \quad \text{Equation (8)}$$

$$\Delta R = c/2B \quad \text{Equation (9)}$$

Depending on the radar type, various forms of radar signals exist. One example is a Channel Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

Figure 4:
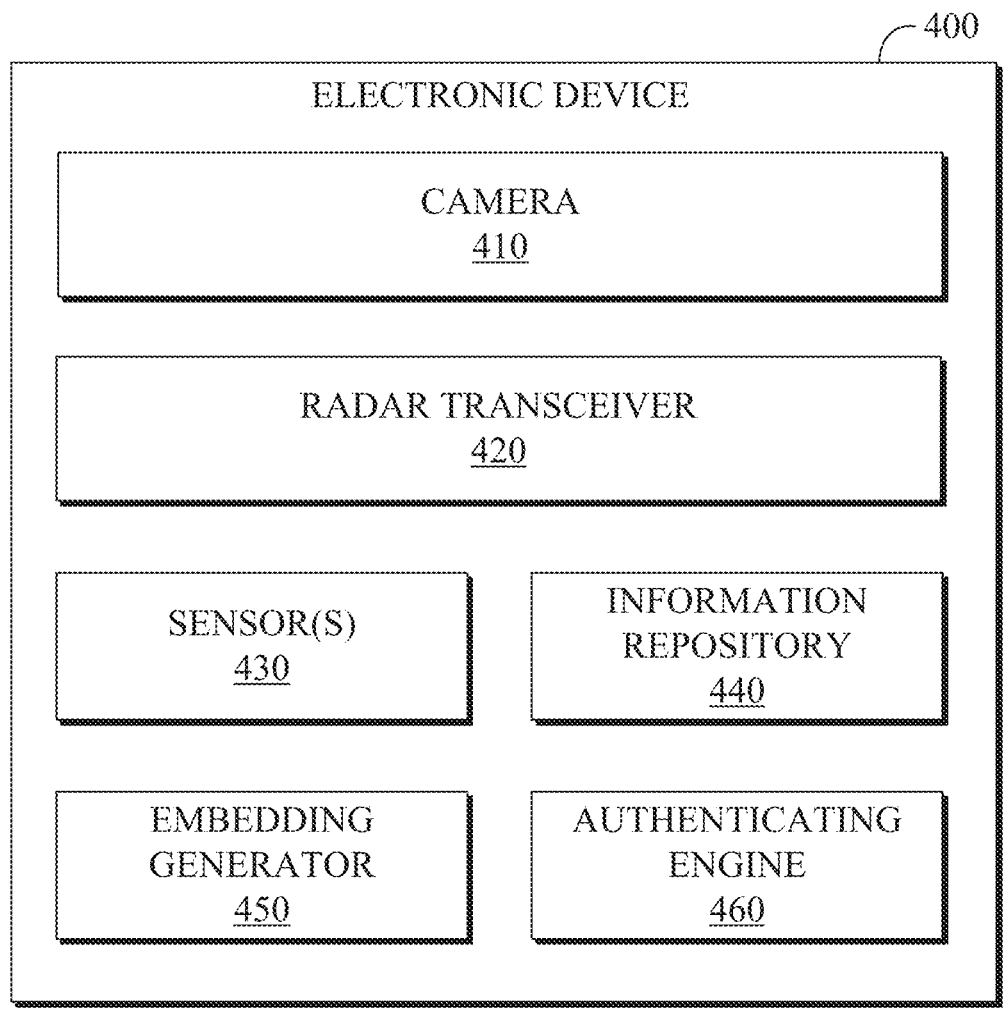
FIG. 4 illustrates a block diagram of an electronic device for radar based authentication in accordance with an embodiment of this disclosure.

FIG. 4 illustrates a block diagram of an electronic device 400, in accordance with an embodiment of this disclosure. The embodiments of the electronic device 400 are for illustration only. Other embodiments can be used without departing from the scope of the present disclosure.

The electronic device 400 can be configured similar to any one of the client devices 106-114 of FIG. 1, the server 104 of FIG. 1, the electronic device 300 of FIGS. 3A and 3B, and can include internal components similar to that of electronic device 200 of FIG. 2. The electronic device 400 includes a camera 410, a radar transceiver 420, sensors 430, an information repository 440, an embedding generator 450, and an authenticating engine 460.

The camera 410 can be similar to the camera 275 of FIG. 2. The camera 410 is capable of capturing a picture or a video. In certain embodiments, the image captured by the camera is of the face of a user. For example, the camera 410 generates facial image data of a user. In addition to facial image data, the camera 410 can capture other objects for biometric authentication.

The radar transceiver 420 can be similar to the radar transceiver 270 of FIG. 2 and include the transmitter 304 and the receiver 306 of FIGS. 3A and 3B. The radar transceiver 420 can include an antenna array similar to the radar transceiver 270 of FIG. 2. The radar transceiver 420 generates a radar signal similar to the signal 314 of FIGS. 3A and 3B. The signals emitted from the radar transceiver 420 are not within the visible spectrum of light and therefore are not observable by the user. The radar transceiver 420 generates facial signature data. The facial signature data can represent the face of the user. In addition to facial signature data, the radar transceiver 420 can capture other objects for biometric authentication.

In certain embodiments, the facial signature data from the radar transceiver 420 is similar to a depth map of the face of a user. For example, the radar transceiver 420 transmits and receives numerous radar signals, similar to the signal 314 of FIGS. 3A and 3B. Based on the time difference between sending and receiving numerous signals, a processor, such as the processor 302 of FIG. 3 can map out the different depths of the face of the user. The radar transceiver 420 can extract a reflection signature, identified as a facial signature data, from the signals that are transmitted towards the user, reflected off of the users face, and detected by the receiver.

In certain embodiments, if the user is wearing a mask the authenticating engine 460 may be unable to authenticate the user via the facial image data from the camera. However, depending on the parameters of the mask, the radar signals, via the radar transceiver 420, can pass through the mask and reflect off the face of the user providing a facial signature data. If the radar signals can pass through the mask and reflect off the face of the user providing a facial signature data that can be used for biometric authentication.

The sensor 430 can be similar to the sensors 265 of FIG. 2. The sensor 430 includes one or more sensors that are used in identifying the illumination condition and sensor condition that are associated with the electronic device 400. For example, the sensor 430 can include an ambient light sensor, a proximity sensor, a contrast detection sensor, and the like. Based on the identified illumination conditions, a weight portfolio indicates a weight to be assigned to the facial image data from the camera 410, the facial signature data from the radar transceiver 420, or various data that is associated with the facial image data and the facial signature data.

In certain embodiments, the sensor 430 is an ambient light sensor. An ambient light sensor can include a photodetector that sensors an amount of ambient light. An illumination condition is identifiable, based on the identified lighting conditions via an ambient light sensor. Based on the illumination condition, a weight is assigned to the facial image data and the facial signature data as indicated in the weight portfolio. Based on the level of ambient light the weight portfolio indicates a confidence or reliability level of the camera 410.

For example, when the lighting conditions are above a threshold, the camera 410 is able to capture an image of a certain quality that is necessary for facial authentication. However, under poor lighting conditions, the camera 410 may be unable to capture an image of a certain quality that is necessary for facial authentication. As such, the output of an ambient light sensor is used to identify the illumination condition. Based on the illumination condition weight is assigned to the data from the camera 410 or the data from the radar transceiver 420. For example, when the ambient light sensor detects ample illumination, a higher weight can be assigned to the data from the camera 410 while a lower weight can be assigned to the data from the radar transceiver 420. Alternatively, when inadequate illumination is detected, a lower weight can be assigned to the data from the camera 410 and a higher weight assigned to the data from the radar transceiver 420.

In certain embodiments, the sensor 430 is a proximity sensor. A proximity sensor can detect the presence of nearby objects without physical contact. A sensor condition is identified, based on a detection of an object via the proximity sensor. Based on the sensor condition, the weight portfolio indicates a confidence or reliability level of the radar transceiver 420.

For example, one or more proximity sensors that are positioned near the radar transceiver 420 can detect whether an object is blocking the target object, such as the face of a user. The object that is positioned between the radar transceiver 420 and the target object, such as the face of the user can be the hand of the user, a finger of the user, an article of clothing, a mirror, and the like. Depending on the object that is positioned between the radar transceiver 420 and the target object, the radar signals can pass through the object or are prematurely reflected. For example, the thickness and material of the object can absorb, block, or reflect radar signals prior to reflecting off the face of the user thereby distorting or preventing the generation of the facial signature data.

For instance, if the hand of the user is positioned between the radar transceiver 420 and the target object (such as the face of a user), the radar signal can bounce off the hand of the user thereby providing incorrect facial signature data. For example, when the proximity sensor detects that an object is blocking the target object, a higher weight can be assigned to the data from the camera 410, a lower weight can be assigned to the data from the radar transceiver 420, or a higher weight can be assigned to the data from the camera 410 while a lower weight can be assigned to the data from the radar transceiver 420. Therefore, the output of the proximity sensor is used to identify the sensor condition.

In certain embodiments, the radar transceiver 420 is partially or completely unavailable for generating a facial signature data. For example, the radar transceiver 420 can be utilized by another feature of the electronic device 400, such as when the electronic device is in a communication mode. During a communication mode, the radar transceiver 420 can transmit and receive data necessary for performing the communication such as audio and video communication as well as wirelessly accessing the server 104 through the network 102 of FIG. 1. The communication mode can also include transmitting and receiving data, such as browsing the internet, or sending and receiving content to a remote server. The electronic device 400 can identify a sensor condition such as when the radar transceiver 420 is partially or completely unavailable. Therefore, a lower weight is assigned to the facial signature data, as indicated in the weight portfolio based on the sensor condition.

The sensor 430 can detect a level of contrast within a captured image from the camera 410. Alternatively, the level of contrast within a captured image from the camera 410 can be detected by another component of the electronic device 400, such as the authenticating engine 460. The electronic device 400 can identify an illumination condition based on the detected a level of contrast of the camera. Based on the illumination condition, a weight can be assigned to the facial image data and the facial signature data as indicated in the weight portfolio. In certain embodiments, the sensor 430 can include a contrast detector. For example, the sensor 430 obtains a captured image of the camera 410 to identify whether the sensor of the camera 410 is saturated by observing the contrast levels of the captured image. When a light source is directed on the camera 410, the captured imaged can become saturated such that the quality of the image is outside of the necessary exposure settings needed for facial authentication. In certain embodiments, a degree of contrast needs to be present between the foreground (such as the face) and the background of the image for authentication purposes. When the sensor 430 detects that the level of contrast within a captured image is saturated, a weight can be assigned to the facial image data, the facial signature data, or both the facial image data and facial signature data based on the weight portfolio.

The information repository 440 can be similar to memory 260 of FIG. 2. The information repository 440 represents any structure(s) capable of storing and facilitating retrieval of information (such as data, program code, or other suitable information on a temporary or permanent basis). The information repository 440 can include a memory and a persistent storage. Memory can be RAM or any other suitable volatile or non-volatile storage device(s), while persistent storage can contain one or more components or devices supporting longer-term storage of data, such as a ROM, hard drive, Flash memory, or optical disc.

In certain embodiments, the information repository 440 includes preregistered user data. The preregistered user data represents data that is used to compare information from the facial signature data against and the facial image data against. When then information from the facial signature data or then information from facial image data is within a threshold of the preregistered user data, the authenticating engine 460 determines to grant the user the requested access. That is, when the information is within a threshold, the authenticating engine 460 verifies that the user is authorized to access the requested information.

The electronic device 400 can include multiple instances of preregistered user data for each person that is authorized access the electronic device 400 and the content within. It is noted that each user associated with the preregistered user data can be given authorization for different content and different levels of access.

In certain embodiments, the information repository 440 includes a weight portfolio. The weight portfolio can represent one or more thresholds and based on which the weights can be assigned to the data generated by the camera 410 and the data generated by the radar transceiver 420.

Based on the illumination conditions and the sensor conditions, the weight portfolio indicates a particular weight is associated with the camera source and the radar source. For example, based on identified illumination conditions and the sensor conditions the weight portfolio can emphasizes the facial image data from the camera 410 or facial signature data from the radar transceiver 420, or both. Similarly, based on identified illumination conditions and the sensor conditions the weight portfolio can deemphasize facial image data from the camera 410 or facial signature data from the radar transceiver 420, or both. Additionally, the weight portfolio can emphasis or deemphasize the camera 410 and/or the radar transceiver 420 based on the identified illumination conditions and the sensor conditions. In certain embodiments, when the illumination condition, the sensor conditions, or both, reach a threshold as indicated by the weight portfolio, a weight is assigned to the camera and the radar is assigned.

In certain embodiments, the weight portfolio is created by the authenticating engine 460. In certain embodiments, the weight portfolio can be received from a remote server, such as the server 104, via network 102 of FIG. 1. The weight portfolio can be customized by preferences of the user. In certain embodiments, the weight portfolio is a table. For example, the table indicates a weight that is assigned to the facial image data and the facial signature data based on the illumination conditions and the sensor conditions. In certain embodiments, the weight portfolio is a function that assigns a weight to facial image data and the facial signature data based on the illumination condition, the sensor conditions, or both.

For example, if the ambient light sensor detects ample illumination, the weight portfolio can assign higher weight to the data from the camera 410 and a lower weight to the data from the radar transceiver 420. Alternatively, in case of inadequate illumination, the weight portfolio can assign a higher weight to the facial signature data of the radar transceiver 420. Alternatively, the weight portfolio can indicate that only the facial signature data from the radar transceiver 420 is to be used for authentication. The weight portfolio can also indicate that a higher weight is assigned to the facial signature data while a lower weight is assigned to the facial image data. Due to a poor lighting condition, the facial image data may not improve the authentication therefore the weight portfolio can indicate not using the camera 410 to generate the facial image data. When the radar transceiver 420 is blocked by an object, as indicated by a proximity sensor, or if the radar transceiver 420 is partially available or not available such as during a communication mode, a lower weight can be assigned to the radar transceiver 420 and higher weight can be assigned to camera mode.

In certain embodiments, multiple illumination conditions and multiple the sensor conditions can be detected. For example, when multiple illumination conditions are detected, the weight portfolio allocates weights associated with the facial signature data and the facial image data, based on the values or magnitudes of the identified illumination conditions. Similarly, when multiple sensor conditions are detected, the weight portfolio allocates weights associated with the facial signature data and the facial image data, based on the values or magnitudes of the identified illumination conditions. The weight portfolio can indicate the weights associated with the facial image data from the camera 410 and the facial signature data from the radar transceiver 420 can be jointly determined by the identified illumination conditions and the sensor conditions that affect both the camera 410 and the radar transceiver 420. For example, when the ambient light sensor detects the level of ambient light is low and the radar transceiver 420 is blocked, the weight is assigned based on the level of ambient light and the amount that the radar transceiver 420 is blocked.

The embedding generator 450 extracts particular data from the facial signature data and the facial image data. The embedding generator 450 uses the extracted data as a comparison template for authentication.

In certain embodiments, the embedding generator 450 is a neural network. A neural network is a combination of hardware and software that is patterned after the operations of neurons in a human brain. Neural network can solve and extract information from complex signal processing, pattern recognition, or pattern production. Pattern recognition includes the recognition of objects that are seen, heard, felt, and the like.

Neural networks process can handle information. For example, a neural network has a parallel architecture. The inputs to a neural network are processed as patterns of signals that are distributed over discrete processing elements, rather than binary numbers. Structurally, a neural network involves a large number of processors that operate in parallel and arranged in tiers. For example, the first tier receives raw input information and each successive tier receives the output from the preceding tier. Each tier is highly interconnected, such that each node in tier n can be connected to multiple nodes in tier n−1 (such as the nodes inputs) and in tier n+1 that provides input for those nodes. Each processing node includes a set of rules that it was originally given or developed for itself over time.

For example, a neural network can recognize patterns in sequences of data. For instance, a neural network can recognize a pattern from the facial image data, the facial signature data, and the like. The neural network can extract particular features from a received facial image data from the camera 410 and the facial signature data from the radar transceiver 420. The authenticating engine 460 inspects the extracted features for verifying the identity of the user.

Neural networks can be adaptable such that a neural network can modify itself as the neural network learns and performs subsequent tasks. For example, initially a neural network can be trained. Training involves providing specific input to the neural network and instructing the neural network what the output is expected. For example, a neural network can be trained to extract particular features for authentication purposes.

The authenticating engine 460 performs the authentication of the user based on at least one of: the facial image data from the camera 410, the facial signature data from the radar transceiver 420, the identified illumination conditions and sensor conditions from the sensor 430, the preregistered data within the information repository 440, the weight portfolio within the information repository 440, and the extracted features from the facial image data and the facial signature data by the embedding generator 450. The authenticating engine 460 performs the authentication of the user by fusing the data from the facial image data and the facial signature data and a confidence level of each source as indicated by the identified illumination and sensor conditions.

The authenticating engine 460 can allocate weight based on the weight portfolio. In certain embodiments, the weight determination for the camera 410 and the radar transceiver 420 can be a function of the illumination and sensor conditions. For instance, allocating the weight can be based on an equation such that the condition metrics and the output of the equation are the corresponding weights. In certain embodiments, the weight determination for the camera 410 and the radar transceiver 420 can implemented as a table mapping the condition metrics to the weights.

In certain embodiments, the authenticating engine 460 identifies the illumination and sensor conditions, and then determines whether only the camera 410 or the radar transceiver 420 will capture data of the user based on the illumination and sensor conditions. For example, the authenticating engine 460 can determine that only the camera 410 will operate after identifying that the illumination condition indicates that illumination is detected above a certain threshold. Similarly, the authenticating engine 460 can determine that only the radar transceiver 420 will operate and capture the facial signature data after identifying that the illumination condition indicates that the ambient light is below a certain threshold.

The camera 410 and the radar transceiver 420 are used in tandem for biometric authentication. For example, the data generated by the camera 410 and the data generated by the radar transceiver 420 are used the authenticating engine 460 derive whether to grant access to the electronic device 400 or the content. In certain embodiments, the authenticating engine 460 authenticates a user using only the camera 410. In certain embodiments, the authenticating engine 460 authenticates a user using only the radar transceiver 420. In other embodiments, the authenticating engine 460 authenticates a user using a weighted fusion of the data from the camera 410 and the data from the radar transceiver 420. Moreover, the authenticating engine 460 can perform the fusion of the data from the camera 410 and the data from the radar transceiver 420 at various stages during the authentication process. In certain embodiments, the fusion is performed at the feature level. In certain embodiments, the fusion is performed at the score level. In certain embodiments, the fusion is performed at the decision level.

In certain embodiments, the data associated with the camera 410 and the radar transceiver 420 is weighted, such that the user is authenticated using only the data from the camera 410 or the radar transceiver 420, based on the illumination and sensor conditions. For example, even if data is gathered from the camera 410 and the radar transceiver 420, the authenticating engine 460 verifies the identity of the user based on the data from either the camera 410 or the radar transceiver 420 based on the weight assigned to each source.

The authenticating engine 460 can combine and fuse information associated with the facial image data from the camera 410 and the facial signature data from the radar transceiver 420 at different levels during the authentication process. The different levels can include an input level, a score level, and a decision level.

At an input level, the authenticating engine 460 weighs and combines the raw information from the camera 410 and the radar transceiver 420. The inputs obtained from the camera 410 can be three dimensional with values ranging between 0 to 255 across red, green and blue channels while the inputs obtained from the radar transceiver 420 can be one-dimensional (e.g. as channel impulse response taps). The authenticating engine 460 applies a transform to raw information from the camera 410, the radar transceiver 420, or both. The authenticating engine 460 applies a transform since raw information from the camera 410 is in a different dimension (or domain) that the raw information from the radar transceiver 420.

For example, the authenticating engine 460 can transform to the facial image data from the camera 410, which extracts the Eigen coefficients of the facial image data, or Eigenface to reduce the data to a low-dimensional representation. Once the facial image data and the facial signature data are dimensionally similar, the authenticating engine 460 can combine the facial image data with the facial signature data. Similarly, the authenticating engine 460 can transform to the facial signature data from the radar transceiver 420 by beamforming. For example, the radar transceiver 420 can create a beamforming map that specifies where the object exists in azimuth and elevation. The beamforming map can be represented in three dimensions based on azimuth, elevation, and distance from the receiver. Thereafter the authenticating engine 460 can combine the facial image data with the facial signature data.

At the score level, the authenticating engine 460 derives a match score associated with the facial image data from the camera 410 and another match score associated with the facial signature data from the radar transceiver 420. The match score is a measurement of how similar the collected information is to the preregistered data. The match score of the facial image data and the match score of the facial signature data are weighted and fused together. Based on the outcome of fusion, the authenticating engine 460 determines whether to authenticate the user.

For example, authenticating engine 460 generates a match score based on the facial image data from the camera 410 and generates another match score based on the facial signature data from the radar transceiver 420. Each of the match scores indicate a how close in similarity, or far in distance the facial image data or the facial signature data is to the registered user of the device. The match scores from the camera 410 and the radar transceiver 420 can be fused by means of multiplying or adding the scores together. In certain embodiments, the match scores are based on a similarity measure or a difference measure. The authenticating engine 460 converts the match score when the match scores are represented by different measurements. For example, if the match score based on the camera 410 is distance and the match score from the radar transceiver 420 is similarity, the authenticating engine 460 converts either the distance from the camera 410 to a similarity measure or converts the similarity from the radar transceiver 420 to a distance measure, and then apply the score level fusion.

At the decision level, the authenticating engine 460 makes a final decision as to authenticate the user based on an individual decision of the facial image data and the facial signature data. The authenticating engine 460 generates a decision as to whether the facial image data from the camera 410 matches the preregistered data and whether the facial signature data from the radar transceiver 420 matches the preregistered data. The authenticating engine 460 then assigns the weight to the independent decisions and generates a single decision as to whether to authenticate the user.

In certain embodiments, the decision level is a binary decision such that the authenticating engine 460 either authenticates or does not authenticate the user. In certain embodiments, the decision level can include more than two decisions such that the authenticating engine 460 authenticates the user, does not authenticate the user, or is unsure as to whether to authenticate the user. When the authenticating engine 460 combines the decisions a weighting scheme from the weight portfolio is assigned to each decision.

Although FIG. 4 illustrates the electronic device 400 various changes can be made to FIG. 4. For example, any number of cameras 410, radar transceivers 420, and sensors 430 can be included electronic device 400.

Figure 5:
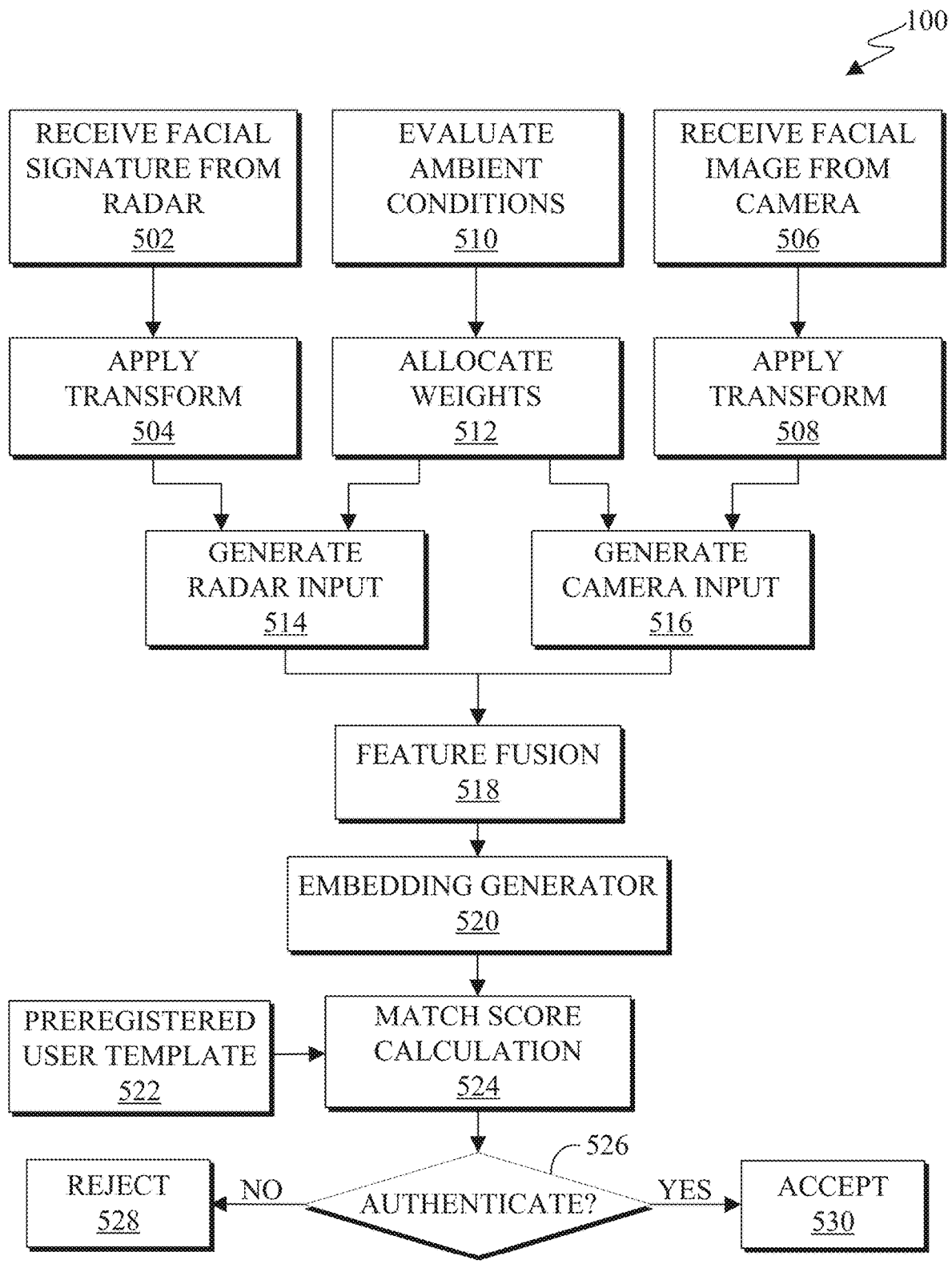
FIG. 5 illustrates a process for authentication at the input level in accordance with an embodiment of this disclosure.
Figure 6:
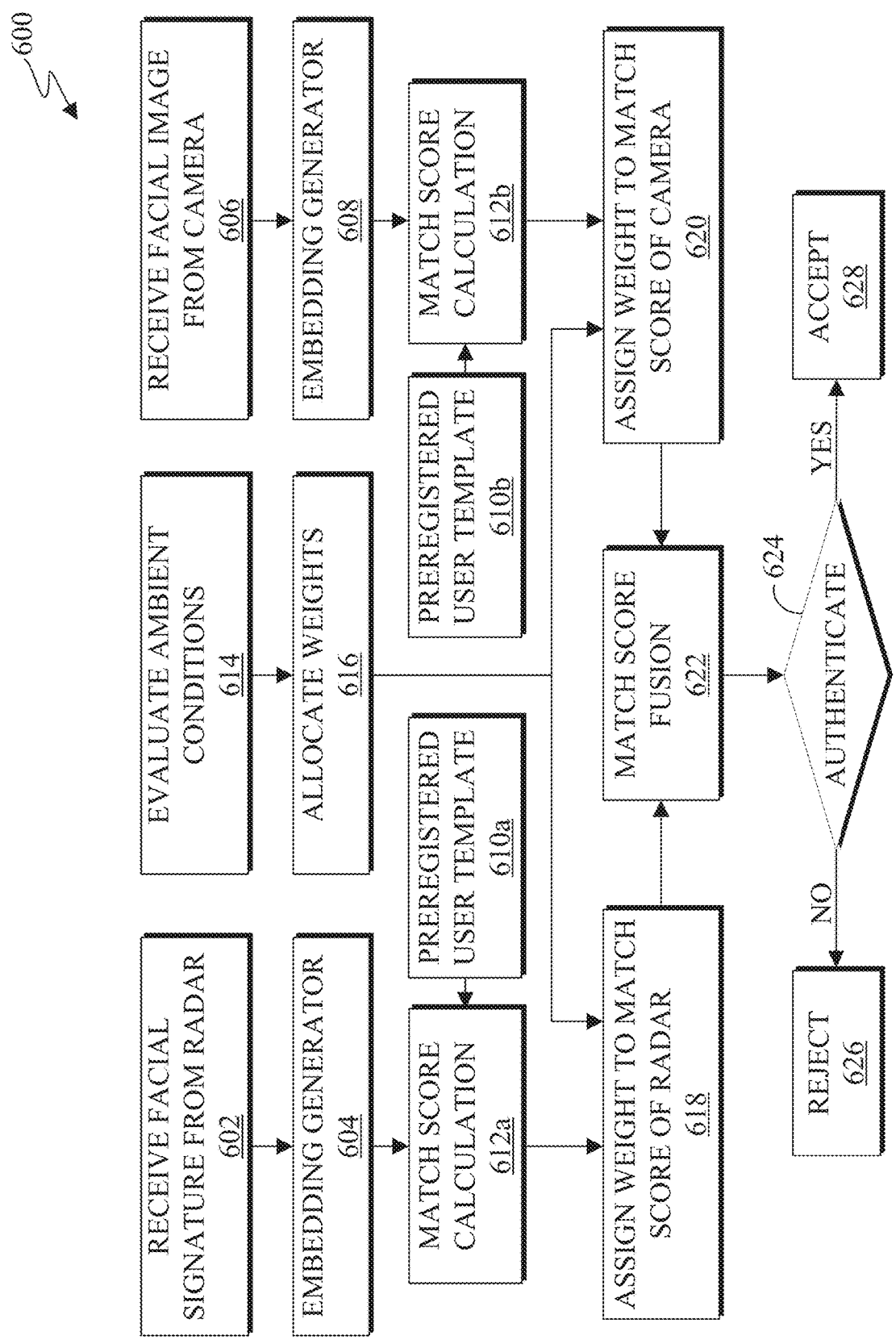
FIG. 6 illustrates a process for authentication at the score level in accordance with an embodiment of this disclosure.
Figure 7:
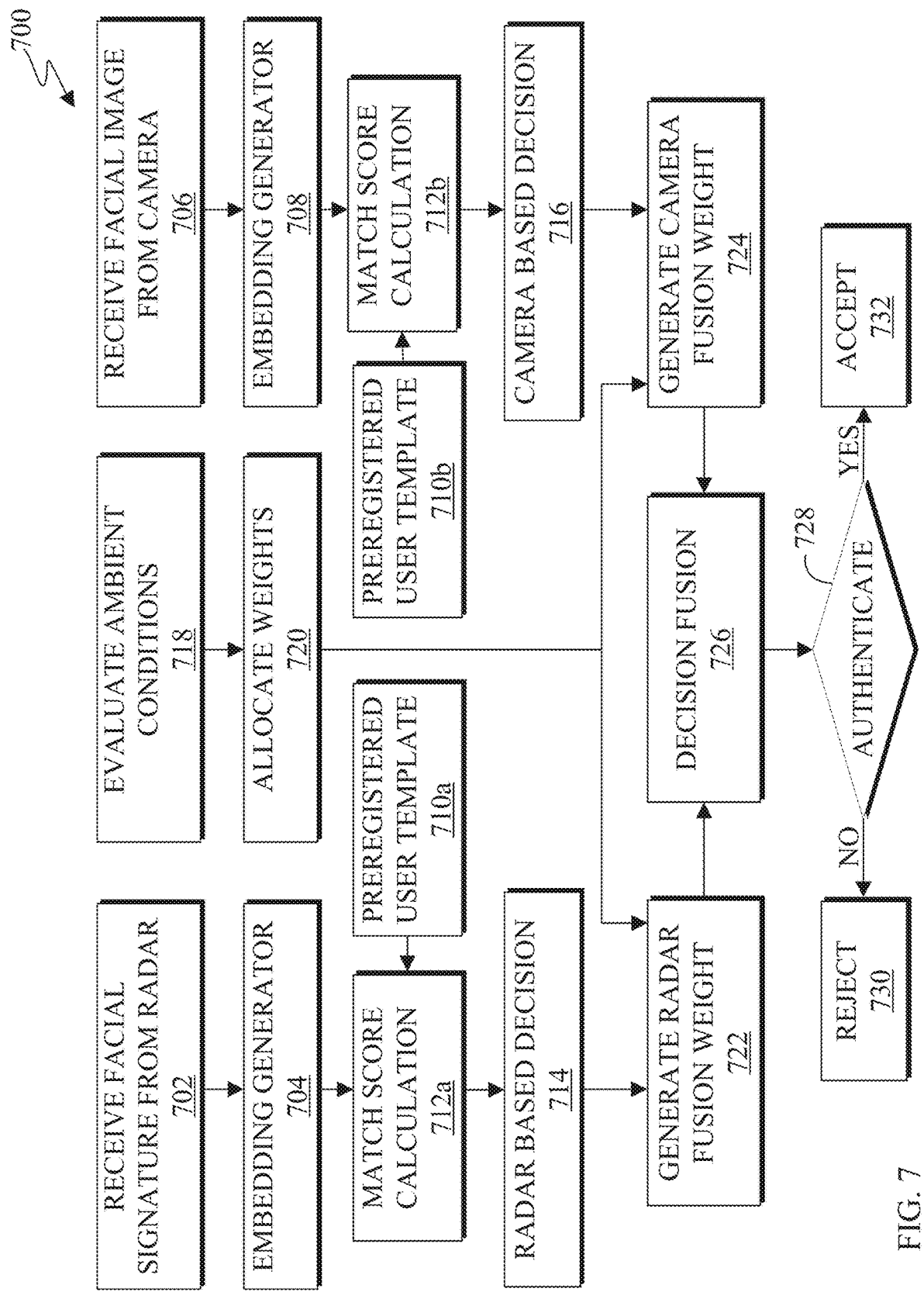
FIG. 7 illustrates a process for authentication at the decision level in accordance with an embodiment of this disclosure.

FIGS. 5, 6, and 7, described below, illustrate various processes for authenticating and verifying the identity of a user at various levels during the authentication process. The authenticating engine 460 of FIG. 4 determines whether to grant a request to authenticate a user at different stages or levels of during the authentication process. For example, the authenticating engine 460 can combine and fuse data associated with the camera 410 and the radar transceiver 420, at different levels, such as an input (or feature) level, a score level, a decision level, or any combination thereof.

At the input level, as illustrated in FIG. 5, raw data is gathered from the camera 410 and the radar transceiver 420 and combined prior to analyzing the data. At the score and decision level, as illustrated in FIGS. 6 and 7, respectively, the authenticating engine 460 analyzes the data from the individual sources (the camera 410 and the radar transceiver 420) and then fuses the results of the analysis.

FIG. 5 illustrates a process 500 for authentication at the input level in accordance with an embodiment of this disclosure. As shown in FIG. 5, the process 500 illustrates the authenticating engine 460 of FIG. 4 determining whether to authenticate a user at the input level. The process 500 can be performed by the server 104 or any of the client devices 106-114 of FIG. 1, the electronic device 200 of FIG. 2, electronic device 300 of FIG. 3, the electronic device 400 of FIG. 4, or any other suitable device or system. For ease of explanation, the process 500 is described as being performed by the authenticating engine 460 of FIG. 4. The embodiments of FIG. 5 are for illustration only. Other embodiments can be used without departing from the scope of this disclosure.

At the input level of authentication, the individual data from the camera 410 and the radar transceiver 420 are fused prior to analyzing the data from each source. At step 502 the authenticating engine 460 receives facial signature data from the radar transceiver 420. Similarly, at step 506 the authenticating engine 460 receives facial image data from the camera 410.

In certain embodiments. the received facial signature data of step 502 and the received facial image data of step 506 are in different domains. For example, the facial image data of step 506 can be in three dimensions with values ranging between 0 and 255, while the facial signature data of step 502 is a single dimension. When the received facial signature data and the facial image data are in different domains, a transform is applied to the facial signature data, the facial image data, or both facial signature data and the facial image data, prior to fusing the facial signature data and the facial image data. The transform modifies the facial signature data, the facial image data, or both facial signature data and the facial image data, such that the facial signature data and the facial image data are within a similar domain.

In step 504 a transform is applied to the data, such as the facial signature data, from the radar transceiver 420. Similarly, in step 508 a transform is applied to the data (such as the facial image data) from the camera 410. The transform that is applied to the data from the radar transceiver 420 modifies the facial signature data. Similarly, the transform that is applied to the data from the camera 410 modifies the facial image data.

In certain embodiments, a transform is applied to either the data from the camera 410 or the data from the radar transceiver 420. For example, the authenticating engine 460 applies the transform of step 504 to the facial signature data and does not apply the transform of step 508 to the facial image data. For another example, the authenticating engine 460 does not apply the transform of step 504 to the facial signature data and applies the transform of step 508 to the facial image data.

In step 510 the authenticating engine 460 evaluates the ambient conditions. For example, the authenticating engine 460 identifies one or more illumination conditions and sensor conditions associated with the electronic device. An illumination condition can indicate a level of ambient light based on an ambient light sensor associated with the electronic device. Additionally, or alternatively, another illumination condition can indicate a contrast level of the facial image data. A sensor condition can indicate whether an antenna associated with the radar transceiver 420 is blocked based on a proximity senor associated with the electronic device. Additionally, or alternatively, another sensor condition can indicate whether the antenna is utilized for communication.

In step 512, the authenticating engine 460 allocates weights associated with the transformed facial signature data and the facial image data as indicated by the weight portfolio based on the identified ambient conditions. For example, the authenticating engine 460 identifies a weight to assign to the facial signature data, the facial image data, or both. The allocated weights indicate a level of reliability associated with the facial image data from the camera 410 and the facial signature data from the radar transceiver 420. For example, a larger weight is applied to the facial signature data as compared to the facial image data indicates that the facial signature data is more reliable that the facial image data due to the ambient conditions.

In step 514, a radar input is generated by assigning the weight to the facial signature data, based on the allocated weights of step 512. The radar input is the data from the radar transceiver 420 (such as the facial signature data) that is transformed and includes a weight indicating a confidence level of the radar input. Similarly, in step 516 a camera input is generated by assigning a weight to the facial image data, based on the allocated weights of step 512. The camera input is the data from the camera 410 (such as the facial image data) that is transformed and includes a weight indicating a confidence level of the camera input.

For example, if an antenna, associated with the radar transceiver 420 is blocked (as indicated by an ambient condition of step 510), the authenticating engine 460 generates the radar input, of step 514 with lower weight as compared to the camera input of step 516. Similarly, if an antenna associated with the radar transceiver 420 is blocked (as indicated by a sensor condition), then the authenticating engine 460 generates the camera input, of step 516 with a higher weight as compared to the radar input of step 514.

If an antenna associated with the radar transceiver 420 is used for another purpose (as indicated by an ambient condition of step 510) and unable to generating a facial signature data the authenticating engine 460 can generate the camera input, of step 516, and not generate the radar input, of step 514. If only the camera input is generated, then the authenticating engine 460 determines wither to authenticate the user based only on the camera input of step 516. For example, the fusion feature of step 518 does not fuse the radar input with the camera input since no radar input is generated.

If the level of ambient light is poor (as indicated by an ambient condition of step 510) the authenticating engine 460 generates the camera input, of step 516, with a lower weight as compared to the radar input, of step 514. Similarly, if the level of ambient light is poor (as indicated by an ambient condition of step 510), the authenticating engine 460 generates the radar input, of step 514, with a higher weight as compared to the camera input of step 516.

If an antenna associated with the radar transceiver 420 is used for another purpose (as indicated by a ambient condition of step 510) and the level of ambient light is poor (as indicated by an ambient conditions of step 510), the authenticating engine 460 can generate the camera input of step 516 and omit generating the radar input of step 514, even though the lighting is poor. For example, the authenticating engine 460 can assign 100% of the weight to the facial image data, regardless of the poor lighting conditions, since the radar transceiver 420 is unable to generate the facial signature data.

If an antenna associated with the radar transceiver 420 is blocked (as indicated by an ambient condition of step 510) and the level of ambient light is poor (as indicated by another ambient condition of step 510), the authenticating engine 460 generate the camera input of step 516 with a higher weight that the radar input of step 514. When the camera input has a higher weight that the radar input, a higher confidence level is associated with the camera input as compared to the radar input In step 518, the authenticating engine 460 fuses the facial image data from the camera 410 and the facial signature data form the radar transceiver 420 based on the assigned weights. For example, the transformed facial signature data and the transformed facial image data can be fused together to generate a fused data representing both the facial signature data and the facial image data. The fusion of the facial signature data and the facial image data is allocated according to the assigned weight.

In step 520, the embedding generator, such as the embedding generator 450 of FIG. 4, extracts features from the fused data. In certain embodiments, a neural network extracts the features. The neural network can be included in the electronic device, such as the electronic device 400. The features can be information that is used for pattern recognition between the fused data and the preregistered user data.

In step 524, the authenticating engine 460 generates a match score indicating the similarity of the distance between the features extracted in step 520 and a preregistered user template 522. The preregistered user template can be similar to the preregistered data that is maintained in the information repository 440 of FIG. 4. The preregistered user template 522 represents data that is previously registered in the electronic device, that can be compared to the fused facial image data and the facial signature data.

In decision 526, the authenticating engine 460 determines whether to grant the request for authentication or reject the request for authentication. The authenticating engine 460 can determine whether to reject the user in step 528 or accept the user in step 530 by comparing the match score to a threshold. For example, if the match score is outside of a threshold, then the authenticating engine 460 can determine not to grant the request for authentication and reject the user, in step 528, since the identity of the user is not verifiable. If the match score is within the threshold, then the authenticating engine 460 can determine to grant the request for authentication and accept the user, in step 530, since the identity of the user is verifiable. In certain embodiments. the threshold can change based on whether the match score is based on a similarity or a distance from the extracted features.

Although FIG. 5 illustrates a process of authentication at the input level various changes can be made to FIG. 5. For example, while shown as a series of steps, various steps in FIG. 5 could overlap, occur in parallel, or occur any number of times.

FIGS. 6 and 7 illustrate the process of analyzing the data from the individual sources (the camera 410 and the radar transceiver 420) and then using the results of the analysis. For example, regarding the score and decision levels, a first decision pipeline associated with the data from the camera 410 determines whether to authenticate the user, and a second decision pipeline associated with the data from the radar transceiver 420 determines whether to authenticate the user. The authenticating engine 460 combines the outputs of each individual pipeline at different stages or levels (such as the score level and the decision level) when identifying the user and determining whether to grant the request for authentication.

For instance, the authenticating engine 460 determines whether to authenticate the user by first comparing (i) the data from the camera 410 to preregistered data to generate a first similarity or difference match score and (ii) the data from the radar transceiver 420 to preregistered data to generate a second similarity or difference match score. At the score level, the first and second match scores are combined and when the match score is within a threshold, the user is authenticated. At the decision level, when the first match score is within a threshold and when the second match score is within a threshold, individual decisions are made as to whether the user is authenticated. After the individual decisions are made as to whether the user is authenticated, the individual decisions are fused and when the fused decision is within a threshold, the user is authenticated.

FIG. 6 illustrates a process 600 for authentication at the score level in accordance with an embodiment of this disclosure. As shown in FIG. 6, the process 600 illustrates the authenticating engine 460 of FIG. 4 determining whether to authenticate a user at the score level. The process 600 can be performed by the server 104 or any of the client devices 106-114 of FIG. 1, the electronic device 200 of FIG. 2, electronic device 300 of FIG. 3, the electronic device 400 of FIG. 4, or any other suitable device or system. For ease of explanation, the process 600 is described as being performed by the authenticating engine 460 of FIG. 4. The embodiments of FIG. 6 are for illustration only. Other embodiments can be used without departing from the scope of this disclosure.

At the score level of authentication, the individual data from the camera 410 and the radar transceiver 420 of FIG. 4 are analyzed individually. For example, the raw data is collected from the camera 410 and the radar transceiver 420. A neural network can extract embeddings from each of the sets of data. Thereafter, the authenticating engine 460 evaluates and compares each of the embeddings individually using preregistered user data. A match score is generated based on the evaluation and comparison of the embeddings from each of the sets of data. The match scores are then fused together, multiple with weights as indicated by a weight portfolio based on the illumination conditions and the sensor conditions. After the fusion, the authenticating engine 460 determines whether to accept or reject the request for authentication.

At step 602 the authenticating engine 460 receives facial signature data from the radar transceiver 420. Similarly, at step 606 the authenticating engine 460 receives facial image data from the camera 410.

In step 604, the embedding generator, such as the embedding generator 450 of FIG. 4, extracts features from the received facial signature data. Similarly, in step 608, the embedding generator, such as the embedding generator 450 of FIG. 4, extracts features from the received facial image data. In certain embodiments, a neural network extracts the features. The neural network can be included in the electronic device, such as the electronic device 400. The features can be information that is used for pattern recognition between the received data and a respective preregistered user data.

In step 612a the authenticating engine 460 generates a match score indicating the similarity of the distance between the features extracted in step 604 and a preregistered user template 610a. The preregistered user template 610a can be similar to the preregistered data that is maintained in the information repository 440 of FIG. 4. The preregistered user template 610a represents data that is previously registered in the electronic device that can be compared to the features extracted from the facial signature data.

Similarly, in step 612b the authenticating engine 460 generates a match score indicating the similarity of the distance between the features extracted in step 608 and a preregistered user template 610b. The preregistered user template 610b can be similar to the preregistered data that is maintained in the information repository 440 of FIG. 4. The preregistered user template 610b represents data that is previously registered in the electronic device that can be compared to the features extracted from the facial image data.

In step 614 the authenticating engine 460 evaluates the ambient conditions. For example, the authenticating engine 460 identifies one or more illumination conditions and sensor conditions associated with the electronic device. An illumination condition can indicate a level of ambient light based on an ambient light sensor associated with the electronic device. Additionally, or alternatively, another illumination condition can indicate a contrast level of the facial image data. A sensor condition can indicate whether an antenna associated with the radar transceiver 420 is blocked based on a proximity senor associated with the electronic device. Additionally, or alternatively, another sensor condition can indicate whether the antenna is utilized for communication. In certain embodiments. the authenticating engine 460 evaluates the ambient conditions at step 614 while receiving the facial signature data from the radar of step 602 and the facial image data from the camera of step 606.

In step 616, the authenticating engine 460 allocates weights associated with the facial signature data and the facial image data as indicated by the weight portfolio based on the identified ambient conditions. For example, the authenticating engine 460 allocates a first weight that is associated with the match score of facial signature data and a second weight that is associated with the match score of facial image data. The allocated weights indicate a level of reliability of each match score. For example, a larger weight is applied to the match score of the facial signature data as compared to the match score of the facial image data indicates that the facial signature data is more reliable that the facial image data due to the ambient conditions.

In step 618, the authenticating engine 460 assigns weight to the match score associated with the data from the radar transceiver 420. Similarly, in step 620, the authenticating engine 460 assigns weight to the match score associated with the data from the camera 410.

In step 622, the authenticating engine 460 generates a score that represents a weighted match score of the facial signature data from radar transceiver 420, and a weighted match score of the facial image data from the camera 410. The authenticating engine 460 can combine and fuse the match scores and their associated weights of steps 618 and 620.

For example, the match score of step 612a can indicate that the extracted features of the facial signature data is 83% similar to the preregistered user template 610a, and the assigned weight indicates that the radar transceiver 420 is 70% reliable. Similarly, the match score of step 612b can indicate that the extracted features of the facial image data is 40% similar to the preregistered user template 610b, and the assigned weight indicates that the radar transceiver 420 is 30% reliable. The authenticating engine 460 generates a single score that represents the similarity score associated with the facial signature data from the radar transceiver 420, the similarity score associated with the facial image data from the camera 410, and the reliabilities of the respective scores.

In certain embodiments, in step 622, the authenticating engine 460 can modify a match score that is based on a similarity to a match score that is based on a difference (or a match score that is based on a difference to a match score that is based on a similarity), such that when the match scores are fused in step 622, the match score of the radar transceiver 420 and the match score of the camera 410 correspond to the same scale (either a difference scale or a similarity scale).

In decision 624, the authenticating engine 460 determines whether to grant the request for authentication or reject the request for authentication by determining whether the fusion score is within a threshold. For example, if the match score is outside of a threshold, then the authenticating engine 460 can determine not to grant the request for authentication and reject 626 the user, since the identity of the user is not verifiable. If the match score is within the threshold, then the authenticating engine 460 can determine to grant the request for authentication and accept 628 the user, since the identity of the user is verifiable.

Although FIG. 6 illustrates a process of authentication at the score level various changes can be made to FIG. 6. For example, while shown as a series of steps, various steps in FIG. 6 could overlap, occur in parallel, or occur any number of times.

FIG. 7 illustrates a process 700 for authentication at the decision level in accordance with an embodiment of this disclosure. As shown in FIG. 7, the process 700 illustrates the authenticating engine 460 of FIG. 4 determining whether to authenticate a user at the decision level. The process 700 can be performed by the server 104 or any of the client devices 106-114 of FIG. 1, the electronic device 200 of FIG. 2, electronic device 300 of FIG. 3, the electronic device 400 of FIG. 4, or any other suitable device or system. For ease of explanation, the process 700 is described as being performed by the authenticating engine 460 of FIG. 4. The embodiments of FIG. 7 are for illustration only. Other embodiments can be used without departing from the scope of this disclosure.

At the decision level, the individual data from the camera 410 and the radar transceiver 420 of FIG. 4 are analyzed individually. For example, the raw data is collected from the camera 410 and the radar transceiver 420. A neural network can extract embeddings, such as features, from each of the sets of data. Thereafter, the authenticating engine 460 evaluates and compares each of the embeddings individually using preregistered user data. A first match score for data from the radar transceiver 420 is generated and a second match score for the data from the camera 410 is generated based on the evaluation and comparison of the extracted features from the facial signature data and the facial image data, respectively. The authenticating engine 460 then determines for each individual score whether to grant or reject the authentication request for each individual match score. A weight is assigned to the individual decisions based on the illumination conditions and sensor conditions. The weighted decisions are then fused together to generate a single decision to accept or reject the user.

At step 702 the authenticating engine 460 receives facial signature data from the radar transceiver 420. Similarly, at step 706 the authenticating engine 460 receives facial image data from the camera 410.

In step 704, the embedding generator, such as the embedding generator 450 of FIG. 4, extracts features from the received facial signature data. Similarly, in step 708, the embedding generator, such as the embedding generator 450 of FIG. 4, extracts features from the received facial image data. In certain embodiments, a neural network extracts the features. The neural network can be included in the electronic device, such as the electronic device 400. The features can be information that is used for pattern recognition between the received data and a respective preregistered user data.

In step 712a the authenticating engine 460 generates a match score indicating the similarity of the distance between the features extracted in step 704 and a preregistered user template 710a. The preregistered user template 710a can be similar to the preregistered data that is maintained in the information repository 440 of FIG. 4. The preregistered user template 710a represents data that is previously registered in the electronic device that can be compared to the features extracted from the facial signature data.

Similarly, in step 712b the authenticating engine 460 generates a match score indicating the similarity of the distance between the features extracted in step 708 and a preregistered user template 710b. The preregistered user template 710b can be similar to the preregistered data that is maintained in the information repository 440 of FIG. 4. The preregistered user template 710b represents data that is previously registered in the electronic device that can be compared to the features extracted from the facial image data.

In step 714, the authenticating engine 460 generates a radar based decision. After generating a match score for the facial signature data, of step 712a, the authenticating engine 460 determines whether the match score is within a threshold. When the match score, of step 712a, is within a threshold, the authenticating engine 460 verifies the identity of the user and preliminarily grants the authorization request. Alternatively, when the match score, of step 712a, is not within a threshold, the authenticating engine 460 preliminarily rejects the authorization request. The radar based decision of step 714 is based solely on the received facial signature data from the radar transceiver 420 of step 702. That is, the radar based decision of step 714 is not weighted due to the ambient conditions such as an illumination conditioner a sensor condition. For example, the decision of step 714 can be based on facial signature data that is partially or fully blocked.

Similarly, in step 716, the authenticating engine 460 generates camera radar based decision. After generating a match score for the facial image data, of step 712b, the authenticating engine 460 determines whether the match score is within a threshold. When the match score, of step 712*b*, is within a threshold, the authenticating engine 460 verifies the identity of the user and preliminarily grants the authorization request. Alternatively, when the match score, of step 712*b*, is not within a threshold, the authenticating engine 460 preliminarily rejects the authorization request. The radar based decision of step 716 is based solely on the received facial image data from the camera 410 of step 706. That is, the camera based decision of step 716 is not weighted due to the ambient conditions such as an illumination conditioner a sensor condition. For example, the decision of step 716 can be based on facial image data where the ambient light was too low to capture a data at a quality level necessary to verify the identity of the user. For another example, the decision of step 716 can be based on facial image data where the contrast of the capture a data was too high and the authenticating engine 460 was unable to verify the identity of the user.

In step 718 the authenticating engine 460 evaluates the ambient conditions. For example, the authenticating engine 460 identifies one or more illumination conditions and sensor conditions associated with the electronic device. An illumination condition can indicate a level of ambient light based on an ambient light sensor associated with the electronic device. Additionally, or alternatively, another illumination condition can indicate a contrast level of the facial image data. A sensor condition can indicate whether an antenna associated with the radar transceiver 420 is blocked based on a proximity senor associated with the electronic device. Additionally, or alternatively, another sensor condition can indicate whether the antenna is utilized for communication. In certain embodiments, the authenticating engine 460 evaluates the ambient conditions at step 718 while receiving the facial signature data from the radar of step 702 and the facial image data from the camera of step 706.

In step 720, the authenticating engine 460 allocates weights associated with the facial signature data and the facial image data based on the identified ambient conditions, of step 718, as according to the weight portfolio. For example, the authenticating engine 460 allocates the weights which indicate the reliability, such as a level of confidence, of the facial signature data and the facial image data. For example, the authenticating engine 460 can allocate a first weight that is associated with the data captured by the radar transceiver 420. The authenticating engine 460 can also allocate a second weight that is associated with the data captured by the camera 410.

In step 722, the authenticating engine 460 assigns the first weight (from the allocated weights of step 720) that is associated with the data captured by the radar transceiver 420 to the radar based decision of step 714 to generate a radar fusion weight. That is, the authenticating engine 460 assigns a weight to the radar based decision of step 714 indicating the reliability of the data to which the decision is based on.

Similarly, in step 724, the authenticating engine 460 assigns the second weight (from the allocated weights of step 720) that is associated with the data captured by the camera 410 to the camera based decision of step 716 to generate a camera fusion weight. That is, the authenticating engine 460 assigns a weight to the camera based decision of step 716 indicating the reliability of the data to which the decision is based on.

In step 726, the authenticating engine 460 combines the radar fusion weight of step 722 with the camera fusion weight of step 724 to generate a second decision of step 728. The decision fusion of step 726 combines the radar based decision, of step 714, and the confidence score of the radar based decision with the camera based decision, of step 716, and the confidence score of the radar based decision.

The second decision, of step 728 determines whether to authenticate the user by rejecting the user in step 730 or accepting the user in step 732. That is, the second decision, of step 728, is based on the binary decisions of steps 714 and 716 (either to accept or reject the user) and their assigned weight. For example, if the radar based decision, of step 714, is that the user is not verified but has a low reliability rating (such as when the proximity sensor indicates an object is blocking the radar transceiver 420), and the camera based decision, of step 716, is that the user is verified with a high reliability rating, then the authenticating engine 460 combines the two decisions and their associated weight and can determine to accept the identity of the user, such as when the decision fusion of step 726 is above a threshold.

Although FIG. 7 illustrates a process of authentication at the decision level various changes can be made to FIG. 7. For example, while shown as a series of steps, various steps in FIG. 7 could overlap, occur in parallel, or occur any number of times.

Figure 8:
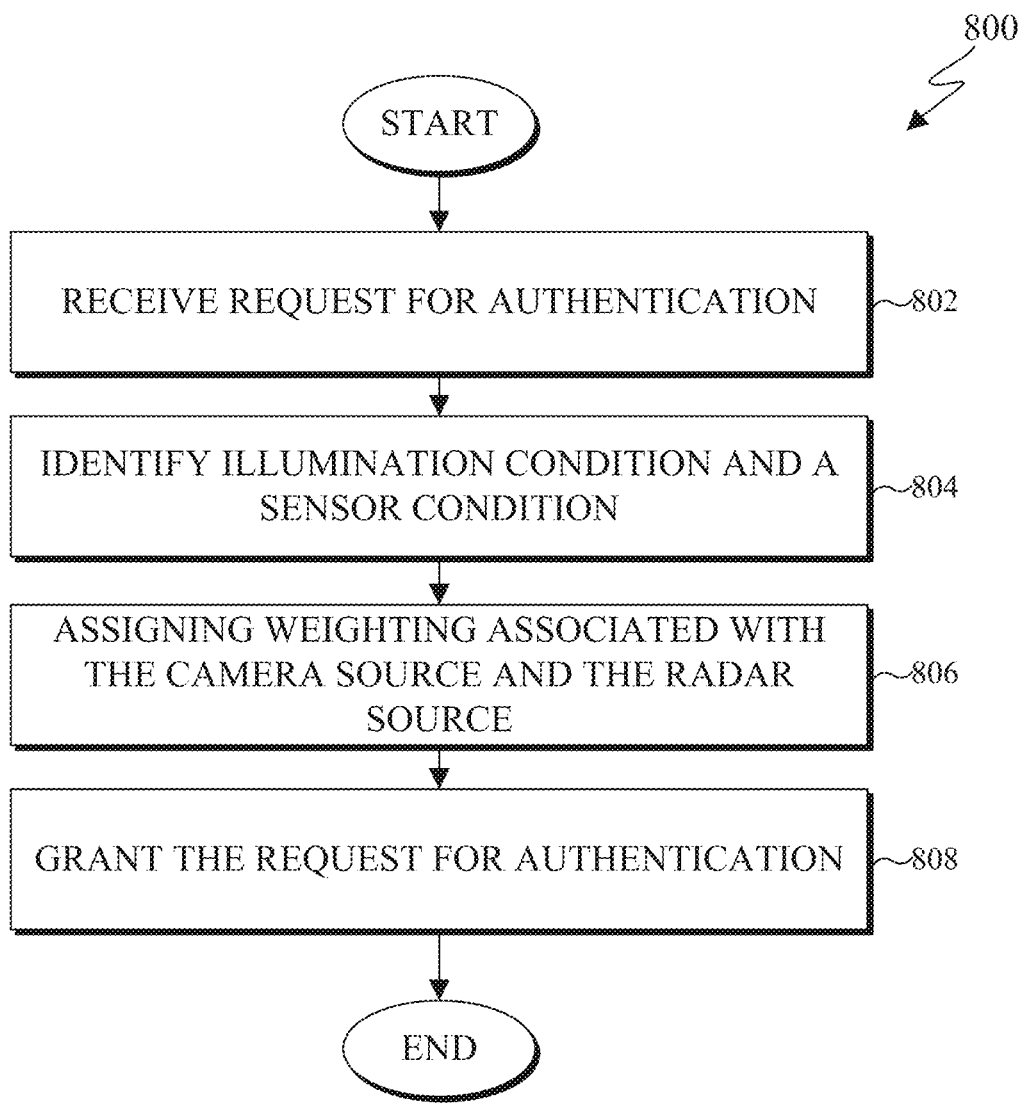
FIG. 8 illustrates a method for multimodal authentication in accordance with an embodiment of this disclosure.

FIG. 8 illustrates a method 800 for multimodal authentication in accordance with an embodiment of this disclosure. The method 800 can be performed by the server 104 or any of the client devices 106-114 of FIG. 1, the electronic device 200 of FIG. 2, electronic device 300 of FIG. 3, the electronic device 400 of FIG. 4, or any other suitable device or system. For ease of explanation, the method 800 is described as being performed by the authenticating engine 460 of FIG. 4. The embodiments of FIG. 8 are for illustration only. Other embodiments can be used without departing from the scope of this disclosure.

In step 802, the authenticating engine 460 receives a request for authentication. The request for authentication can be received based on a user attempting to access the electronic device, such as unlocking the device. For example, when the electronic device is in a locked state, the electronic device can receive an input to unlock the device. The input to unlock the device would then initiate the request for authentication. The request for authentication can be received in response to a user accessing a particular program, application, or file on the electronic device. For example, if a user selects a protected document, the document might initiate the request for authentication. For another example, if a user selects a particular program or application on the electronic device that requires authentication, the selected program or application would imitate the request for authentication.

In certain embodiments, in addition to receiving the request for authentication, the authenticating engine 460 receives facial signature data that is generated based on an input from a radar source. The facial signature data represents a facial image of the user generated by transmitting radar signals that are reflected and received by the radar transceiver 420. Similarly, in addition to receiving the request for authentication, the authenticating engine 460 receives facial image data that is generated based on an input from a camera of the electronic device. The facial image data represents a facial image of a user as captured by a camera on the electronic device.

In certain embodiments, upon receiving the request for authentication, the authenticating engine 460 receives the facial signature data and the facial image data. For example, once the authenticating engine 460 receiving the request for authentication, the authenticating engine 460 can instruct the camera 410 and the radar transceiver 420 to capture the facial image data and the facial signature data, respectively. In another example, when the request for authentication is initiated such as by a program, application, or document, the request could instruct the camera 410 to generate the facial image data and instruct the radar transceiver 420 to generate the facial image data.

In step 804, the authenticating engine 460 identifies illumination and sensor conditions. An illumination condition can be identified prior to receiving the facial image data or after receiving the facial image data. A sensor condition can be identified prior to receiving the facial signature data or after receiving the facial signature data.

The authenticating engine 460 can identify an illumination condition from the sensor 430 such as a light sensor. For example, the light sensor can indicate the level of ambient light available. The level of ambient light enables the authenticating engine 460 to determine the reliability and confidence level that the camera 410 can capture a quality image necessary for authentication.

The authenticating engine 460 can identify an illumination condition after the facial image data is generated by the camera 410. For example, the authenticating engine 460 can inspect the facial image data to identify a contrast level of the facial image data. If the contrast level is too high, such that the image is washed out and the distinction between the foreground and the background is below a threshold, the authenticating engine 460 can identify that the quality of the image for authentication is too low.

The authenticating engine 460 can identify a sensor condition from the sensor 430, such as a proximity sensor. For example, a proximity sensor, positioned near the radar transceiver 420 can detect whether the radar transceiver 420 is fully or partially blocked by an object positioned between the radar transceiver 420 and the target object, such as the face of the user. The object blocking the radar transceiver 420 can be the hand of the user, such as when the hand, that is holding the electronic device, is positioned over the radar transceiver 420.

The authenticating engine 460 can detect whether the radar transceiver 420 is currently used for another purpose other than generating the facial signature data. For example, the authenticating engine 460 can determine whether the radar transceiver 420 is transmitting and receiving data unrelated to generating the facial signature data. In certain embodiments, when the radar transceiver 420 is transmitting and receiving data unrelated to generating the facial signature data, such as during general communication with a base station the radar transceiver 420 is unable to also generate transmit and receive the reflected radar signals to generate the facial signature data.

In certain embodiments, when the request for authentication is received, the authenticating engine 460 receives the illumination and sensor conditions prior to receiving the facial signature data and the facial image data. For example, if the information from the light sensor indicates the ambient light is too low to generate the facial image data from the camera 410, the authenticating engine 460 can request and receive the facial signature data from the radar transceiver 420 and not the facial image data. For another example, if the information from the radar transceiver 420 indicates that the radar transceiver 420 is currently being used, such as for communication, the authenticating engine 460 can request and receive the facial image data from the camera 410 and not the facial signature data from the radar transceiver.

In step 806, the authenticating engine 460 assigns weight associated with the camera source and a weight associated with the radar source. In certain embodiments, the weight is assigned to the facial image data and the facial signature data itself. In certain embodiments, the weight is assigned to decisions of the authenticating engine 460 (such as generating a score or a binary decision to authenticate) based on the facial image data and the facial signature data. In certain embodiments, the weight is assigned to both the facial image data and the facial signature data as well as to decisions of the authenticating engine 460 based on the facial image data and the facial signature data.

For example, when the weight is assigned to the facial image data and the facial signature data itself, the authenticating engine 460 assigns a sign a first value to the facial signature data and a second value to the facial image data based on the illumination condition and the sensor conditions. The first value and the second value can indicate a level of reliability of the radar source and the camera, respectively.

For another example, when the weight is assigned to decisions of the authenticating engine 460, the authenticating engine 460 assigns a first value to a decision based on the facial image data and a second value to a decision based on the facial signature data based on the illumination condition and the sensor conditions. The first value and the second value can indicate a level of reliability of the radar source and the camera, respectively.

In step 808, the authenticating engine 460 determines whether to grant the request for authentication. When determining whether to grant the request for authentication of a user, a neural network can extract features from the facial image data and the facial signature data. The authenticating engine 460 then compares the extracted features from the facial image data and the facial signature data to preregistered data.

In certain embodiments. the authenticating engine 460 assigns the weight at different stages during the authentication process. For example, the authenticating engine 460 assigns the weight during the input level of authentication. For another example, the authenticating engine 460 assigns the weight during the score level of authentication For another example, the authenticating engine 460 assigns the weight during the decision level of authentication.

When the weight is assigned during the input level, the authenticating engine 460 receives the raw data from the camera 410 and the radar transceiver 420. The authenticating engine 460 then generates an input. To generate the input the authenticating engine 460 applies one or more transformations to at least one of the data from the camera 410 and the radar transceiver 420. The transformation modifies the raw data from the camera 410, the radar transceiver 420, or both, such that the data can be combined. To generate the input the authenticating engine 460 also applies the weight based on the identified illumination condition and the sensor condition.

After a transform is applied to the raw data from the camera 410, the radar transceiver 420, and the weight is applied, the authenticating engine 460, the fuses the data together. Fusing the data together generates a single input by combining both the weighted raw data from the camera 410 and the weighted raw data from the radar transceiver 420. Thereafter, the embedding generator 450 extracts the features from the fused input.

The authenticating engine 460 then generates a score by comparing the extracted features with preregistered data. The preregistered data is based on fused data from the camera 410 and the radar transceiver 420. The score indicates how similar or how distant the extracted features are as compared to the preregistered data. When the score is above a threshold, the authenticating engine 460 verifies the identity of the user and authenticates the user. When the score is below a threshold, the authenticating engine 460 does not authenticate the user.

When the weight is assigned during the score level, the authenticating engine 460 receives the raw data from the camera 410, such as the facial image data, and the radar transceiver 420, such as the facial signature data. The embedding generator 450 extracts the features from the facial image data. Similarly, the embedding generator 450 extracts the features from the facial signature data. The authenticating engine 460 generates a camera based score by comparing the extracted features of the facial image data with a first set of preregistered data. The first set of preregistered data corresponds to ground truth data from a camera source used to identify the user.

The authenticating engine 460 generates a radar based score by comparing the extracted features of the facial signature data with a second set of preregistered data. The second set of preregistered data corresponds to ground truth data from a radar transceiver source used to identify the user. After generating the score associated with the facial image data, the authenticating engine 460 applies the weight based on the illumination and sensor conditions. Similarly, after generating the score associated with the facial signature data, the authenticating engine 460 applies the weight based on the illumination and sensor conditions.

The authenticating engine 460 then combines the weighted score of the data from the camera 410 with the weighted score of the data from the radar transceiver 420. The authenticating engine 460 then determines whether to authenticate the user based on the fused score. For example, if the fused score is above a threshold, then the authenticating engine 460 verifies the identity of the user and authenticates the user. When the fused score is below a threshold, the authenticating engine 460 does not authenticate the user.

When the weight is assigned during the decision level, the authenticating engine 460 receives the raw data from the camera 410, such as the facial image data, and the radar transceiver 420, such as the facial signature data. The embedding generator 450 extracts the features from the facial image data. Similarly, the embedding generator 450 extracts the features from the facial signature data. The authenticating engine 460 generates a camera based score by comparing the extracted features of the facial image data with a first set of preregistered data. The first set of preregistered data corresponds to ground truth data from a camera source used to identify the user. The authenticating engine 460 generates a radar based score by comparing the extracted features of the facial signature data with a second set of preregistered data. The second set of preregistered data corresponds to ground truth data from a radar transceiver source used to identify the user.

The authenticating engine 460 then determines whether to authenticate the user based on the score associated with the facial image data. For example, if the facial image data score is above a threshold, the authenticating engine 460 preliminarily determines to authenticate the user. When the facial image data score is below a threshold, the authenticating engine 460 preliminarily determines to not authenticate the user. The authenticating engine 460 also determines whether to authenticate the user based on the score associated with the facial signature data. For example, if the facial signature data score is above a threshold, the authenticating engine 460 preliminarily determines to authenticate the user. When the facial signature data score is below a threshold, the authenticating engine 460 preliminarily determines to not authenticate the user.

After generating the preliminary decision associated with the facial image data, the authenticating engine 460 applies the weight to the preliminary decision based on the illumination and sensor conditions. Similarly, after generating the preliminary decision associated with the facial signature data, the authenticating engine 460 applies the weight preliminary decision based on the illumination and sensor conditions.

The authenticating engine 460 then fuses the both of the weighted preliminary decisions together. The authenticating engine 460 then determines whether to authenticate the user based on the fused weighted preliminary decisions. For example, if the fused preliminary decision is above a threshold, then the authenticating engine 460 verifies the identity of the user and authenticates the user. When the fused preliminary decision is below a threshold, the authenticating engine 460 does not authenticate the user.

In certain embodiments, that the authenticating engine 460 can combine the weight during multiple states of the authentication process. For example, the authenticating engine 460 can assign weight during the input level and the score level of the authentication process. For another example, the authenticating engine 460 can assign weight during the input level and the decision level of the authentication process. For yet another example, the authenticating engine 460 can assign weight during the score level and the decision level of the authentication process. Similarly, the authenticating engine 460 can assign weight during the input, score, and decision levels of the authentication process.

In certain embodiments, the camera 410 or the radar transceiver 420 is disabled, such that the authenticating engine 460 receives only the facial image data or the facial signature data. For example, if the scene is bright enough for the camera based face verification, based on at least one of an illumination condition or sensor condition, the authenticating engine 460 can disable the radar based face verification. Alternatively, if the scene is inadequately illuminated based on at least one of an illumination condition or sensor condition, the authenticating engine 460 can disable the camera based face verification.

Although FIG. 8 illustrates one example of a method 800 for multimodal authentication, various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for authentication, the electronic device comprising:
   a radar source configured to generate a first input;
   a camera configured to generate a second input; and
   a processor configured to:
      generate facial signature data from the first input and facial image data from the second input,
      receive a request for authentication,
      identify an illumination condition and a sensor condition associated with the electronic device, wherein the illumination condition indicates a quality of the facial image data and the sensor condition indicates a quality of the facial signature data,
      assign a weight associated with the camera and the radar source based on the illumination condition and the sensor condition, and
      grant the request when at least one of the facial signature data and the facial image data are within a threshold of similarity with a preregistered facial data associated with the weight.

2. The electronic device of claim 1, wherein:
   the electronic device further comprises a neural network, and
   the processor is further configured to:
      extract, using the neural network, features from the facial signature data and the facial image data, and
      compare the features to the preregistered facial data when determining whether to grant the request.

3. The electronic device of claim 1, wherein:
   to identify the illumination condition, the processor is configured to identify at least one of:
      a level of ambient light based on an ambient light sensor associated with the electronic device, and
      a contrast level of the facial image data, to identify the sensor condition, the processor is configured to detect at least one of:
      whether an antenna, associated with the radar source, is blocked based on a proximity senor associated with the electronic device, and
      whether the antenna is utilized for communication; and
   to assign the weight the processor is configured to assign a first value to the facial signature data and a second value to the facial image data based on at least one of the illumination condition and the sensor condition, wherein the first value and the second value indicate a level of reliability of the radar source and the camera, respectively.

4. The electronic device of claim 1, wherein the weight is assigned during at least one of:
   an input level during the authentication;
   a score level during the authentication; and
   a decision level during the authentication.

5. The electronic device of claim 4, wherein when the weight is assigned during the input level, the processor is configured to:
   generate an authentication input by combining the facial signature data and the facial image data based on the weight;
   extract features from the authentication input;
   generate a value representing a difference between the features and the preregistered facial data; and
   determine to grant the request when the value is within a threshold.

6. The electronic device of claim 4, wherein when the weight is assigned during the score level, the processor is configured to:
   extract features from the facial signature data and the facial image data;
   generate a first value representing a difference between the features from the facial signature data and the preregistered facial data and a second value representing a difference between the features from the facial image data and the preregistered facial data;
   generate a single value by combining the first value with the second value according to the weight; and
   determine to grant the request when the single value is within a threshold.

7. The electronic device of claim 4, wherein when the weight is assigned during decision level:
   extract features from the facial signature data and the facial image data;
   generate a first value representing a difference between the features from the facial signature data and the preregistered facial data and a second value representing a difference between the features from the facial image data and the preregistered facial data;
   generate a first decision by comparing the first value to a first threshold and a second decision by comparing the second value to the first threshold;
   combine the first decision and the second decision based on the weight; and
   determine to grant the request when the combination of the first decision and the second decision is within a second threshold.

8. A method of authentication on an electronic device, the method comprising:
   receiving a request for authentication, facial signature data generated based on an input from a radar source of the electronic device, and facial image data generated based on an input from a camera of the electronic device;
   identifying an illumination condition and a sensor condition associated with the electronic device, wherein the illumination condition indicates a quality of the facial image data and the sensor condition indicates a quality of the facial signature data;
   assigning a weight associated with the camera and the radar source based on the illumination condition and the sensor condition; and
   granting the request when at least one of the facial signature data and the facial image data are within a threshold of similarity with a preregistered facial data associated with the weight.

9. The method of claim 8, further comprising:
   extracting, using a neural network, features from the facial signature data and the facial image data, and
   comparing the features to the preregistered facial data when determining whether to grant the request.

10. The method of claim 8, wherein:
    identifying the illumination condition comprises at least one of:
       identifying a level of ambient light, and
       identifying a contrast level of the facial image data, identifying the sensor condition comprises at least one of:
    detecting whether an antenna, associated with the radar source, is blocked, and
        detecting whether the antenna is utilized for communication; and
    assigning the weight assigns a first value to the facial signature data and a second value to the facial image data based on at least one of the illumination condition and the sensor condition, wherein the first value and the second value indicate a level of reliability of the radar source and the camera, respectively.

11. The method of claim 8, wherein the weight is assigned during at least one of:
    an input level during the authentication;
    a score level during the authentication; and
    a decision level during the authentication.

12. The method of claim 11, further comprising, when the weight is assigned during the input level:
    generating an authentication input by combining the facial signature data and the facial image data based on the weight;
    extracting features from the authentication input;
    generating a value representing a difference between the features and the preregistered facial data; and
    determining to grant the request when the value is within a threshold.

13. The method of claim 11, further comprising, when the weight is assigned during the score level:
    extracting features from the facial signature data and the facial image data;
    generating a first value representing a difference between the features from the facial signature data and the preregistered facial data and a second value representing a difference between the features from the facial image data and the preregistered facial data;
    generating a single value by combining the first value with the second value according to the weight; and
    determining to grant the request when the single value is within a threshold.

14. The method of claim 11, further comprising, when the weight is assigned during decision level:
    extracting features from the facial signature data and the facial image data;
    generating a first value representing a difference between the features from the facial signature data and the preregistered facial data and a second value representing a difference between the features from the facial image data and the preregistered facial data;
    generating a first decision by comparing the first value to a first threshold and a second decision by comparing the second value to the first threshold;
    combining the first decision and the second decision based on the weight; and
    determining to grant the request when the combination of the first decision and the second decision is within a second threshold.

15. A non-transitory computer readable medium embodying a computer program, the computer program comprising computer readable program code that, when executed by a processor of an electronic device, causes the processor to:
    receive a request for authentication, facial signature data generated based on an input from a radar source of the electronic device, and facial image data generated based on an input from a camera of the electronic device;
    identify an illumination condition and a sensor condition associated with the electronic device, wherein the illumination condition indicates a quality of the facial image data and the sensor condition indicates a quality of the facial signature data;
    assign a weight associated with the camera and the radar source based on the illumination condition and the sensor condition; and
    grant the request when at least one of the facial signature data and the facial image data are within a threshold of similarity with a preregistered facial data associated with the weight.

16. The non-transitory computer readable medium of claim 15, wherein the program code, when executed by the processor, further causes the processor to:
    extract, using a neural network, features from the facial signature data and the facial image data, and
    compare the features to the preregistered facial data when determining whether to grant the request.

17. The non-transitory computer readable medium of claim 15, wherein the weight is assigned during at least one of:
    an input level during the authentication;
    a score level during the authentication; and
    a decision level during the authentication.

18. The non-transitory computer readable medium of claim 17, wherein the program code, when executed by the processor, further causes the processor to:
    generate an authentication input by combining the facial signature data and the facial image data based on the weight;
    extract features from the authentication input;
    generate a value representing a difference between the features and the preregistered facial data; and
    determine to grant the request when the value is within a threshold.

19. The non-transitory computer readable medium of claim 17, wherein the program code, when executed by the processor, further causes the processor to:
    extract features from the facial signature data and the facial image data;
    generate a first value representing a difference between the features from the facial signature data and the preregistered facial data and a second value representing a difference between the features from the facial image data and the preregistered facial data;
    generate a single value by combining the first value with the second value according to the weight; and
    determine to grant the request when the single value is within a threshold.

20. The non-transitory computer readable medium of claim 17, wherein the program code, when executed by the processor, further causes the processor to:
    extract features from the facial signature data and the facial image data;
    generate a first value representing a difference between the features from the facial signature data and the preregistered facial data and a second value representing a difference between the features from the facial image data and the preregistered facial data;
    generate a first decision by comparing the first value to a first threshold and a second decision by comparing the second value to the first threshold;
    combine the first decision and the second decision based on the weight; and determine to grant the request when the combination of the first decision and the second decision is within a second threshold.

* * * * *